(12) United States Patent
Shimoon et al.

(10) Patent No.: US 12,542,132 B1
(45) Date of Patent: Feb. 3, 2026

(54) SPEECH PROCESSING ARCHITECTURE INTERFACES

(71) Applicant: Amazon Technologies, Inc., Seattle, WA (US)

(72) Inventors: Armen Shimoon, Las Vegas, NV (US); Christopher Anthony Venezia, Dublin, CA (US); Henrik Frystyk Nielsen, Hunts Point, WA (US); Ying Shi, Bellevue, WA (US); Luu Tran, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 205 days.

(21) Appl. No.: 18/541,827

(22) Filed: Dec. 15, 2023

(51) Int. Cl.
*G10L 15/183* (2013.01)

(52) U.S. Cl.
CPC .................................. *G10L 15/183* (2013.01)

(58) Field of Classification Search
CPC ... G10L 15/18; G10L 15/23; G10L 2015/223; G10L 15/22; G10L 15/1822; G10L 15/16; G10L 13/00; G10L 15/063; G06F 40/30; G06F 3/167; G06F 13/08
See application file for complete search history.

(56) References Cited

U.S. PATENT DOCUMENTS

2024/0073219 A1* 2/2024 Maizels ................ G10L 13/00

* cited by examiner

Primary Examiner — Jakieda R Jackson
(74) Attorney, Agent, or Firm — Pierce Atwood LLP

(57) ABSTRACT

Systems and methods for input processing architecture interfaces include receiving first audio data representing a first voice command within a first input processing architecture. A first action domain associated with the first voice command may be determined by the first input processing architecture. A first domain API may be determined, wherein the first domain API is predefined for interfacing with a second input processing architecture. Utilizing an application of multiple applications, a first input processing result associated with the first voice command may be determined. The first input processing result may be provided to the first domain API. The first input processing architecture may be caused to utilize the first input processing result from the first domain API to determine a first action to be performed responsive to the first voice command.

20 Claims, 15 Drawing Sheets

800

Receive first user input within first input processing architecture, first input processing architecture including language model (LM) configured for determining responses to user inputs
802

Determine, by LM of first input processing architecture, first action plan associated with first action domain, first action domain being one of multiple action domains utilized by first input processing architecture to respond to user inputs
804

Determine first domain application programming interface (API) associated with first action domain
806

Determine, after first action plan is determined by LM, that first domain API is predefined for interfacing with second input processing architecture that differs at least in part from first input processing architecture, second input processing architecture being associated with multiple applications configured to determine actions to be performed responsive to first user input, application of multiple applications being associated with first domain API
808

Determine, utilizing application associated with second input processing architecture, first input processing result associated with first user input, first input processing result differing at least partially from first action plan determined by LM
810

Provide first input processing result to first domain API
812

Cause, utilizing LM, first input processing architecture to utilize first domain API and first input processing result to determine first action to be performed responsive to first user input
814

FIG. 8

SPEECH PROCESSING ARCHITECTURE INTERFACES

BACKGROUND

Devices, including voice interface devices, have become available. Some of these devices may be utilized to perform actions in environments.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 8 illustrates a flow diagram of an example process associated with input processing architecture interfaces.

DETAILED DESCRIPTION

Figure 1A:
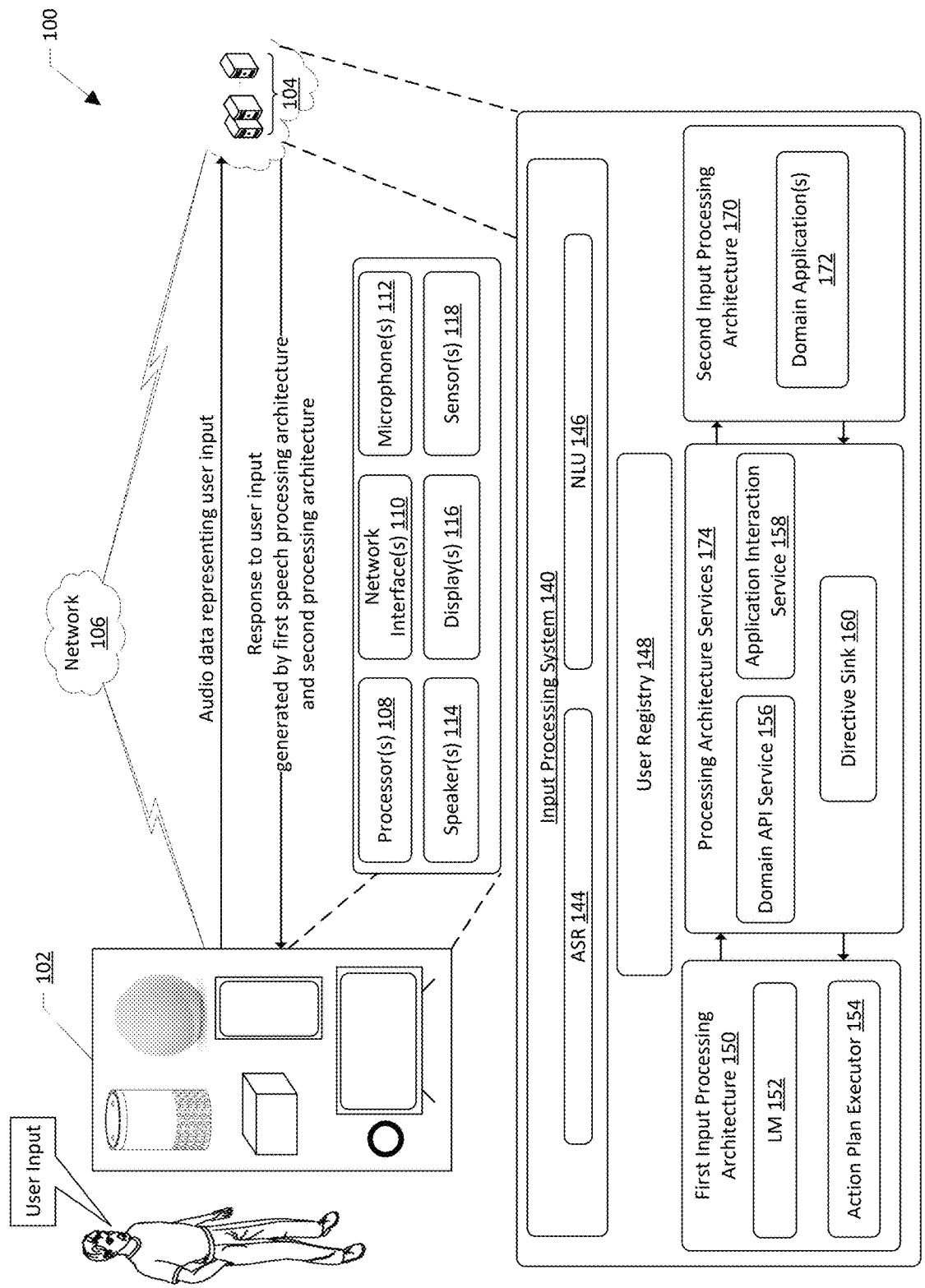
FIG. 1A illustrates a schematic diagram of an example environment for input processing architecture interfaces.

Systems and methods for speech processing architecture interfaces are disclosed, among other things. Take, for example, an environment (such as a space in and/or around a home, hotel, vehicle, office, store, restaurant, etc.) where one or more devices may be present. The devices may be utilized by one or more users or may otherwise be utilized to detect and/or control conditions associated with the environments. For example, the electronic devices may include voice interface devices (e.g., smart speaker devices, mobile phones, tablets, personal computers, televisions, appliances like refrigerators and microwaves, etc.), graphical interface devices (e.g., televisions, set top boxes, virtual/augmented reality headsets, etc.), wearable devices (e.g., smart watch, earbuds, healthcare devices), transportation devices (e.g., cars, bicycles, scooters, etc.), televisions and/or monitors, smart thermostats, security systems (including motion sensors and open/close sensors, including sensors that indicate whether a security system is armed, disarmed, or in a "home mode"), smart cameras (e.g., home security cameras), and/or touch interface devices (tablets, phones, steering wheels, laptops, kiosks, billboard, other devices with buttons, etc.). Some devices can be multiple types of those noted above.

In these and other scenarios, a given device may be a voice interface device that is configured to receive audio representing a voice command from a user and to generate corresponding audio data representing the voice command. Generally, the audio data may be then sent from the device to components of a speech processing system for speech processing. Such a speech processing system may typically include a first speech processing architecture that performs automatic speech recognition (ASR) processes and/or natural language understanding (NLU) processes to determine an intent associated with the voice command and then to utilize that intent to determine an action to be performed responsive to the voice command. Alternatively, or additionally, the device itself may have a speech processing system configured to perform ASR and/or NLU.

In examples, the voice command may be determined to be associated with a known user in a registry. In those examples, the identified user's communication preferences may be known and may be utilized to aid the first speech processing architecture in determining intent data. For example, the user's communication preferences could include a unique vernacular associated with the user that includes multiple definitions for similar words, alternate pronunciations for known words, or words and phrases specifically associated with known actions. Additionally, the user's communication preferences could also include the user's preferred communication delivery methods and devices associated with the user. For example, the communication delivery method preferences could include a preference to only provide audible responses in certain areas during specified hours of the day. The user registry may also include device information associated with the user, which would aid in determining a communication delivery method for the user. For example, if the user issued a voice command for information, the requested information could be displayed on the user's phone, tablet, or laptop instead of a device that is common to all users in the registry.

In examples, various speech processing models and historical response data, along other data, may be developed over time to more accurately respond to voice commands. However, as additional and/or different technologies are developed that are associated with speech processing, other potentially preferred speech processing architectures may be desirable. One example of a preferred speech processing architecture might include a LM, and an example of a secondary processing architecture may be a legacy application-based system where individual applications associated with individual domains are called to determine responses to voice commands. In circumstances where there is a preferred speech processing architecture, a given device may receive audio representing a voice command, and the given device may be configured to send the audio data directly to the preferred speech processing architecture for speech processing. When the preferred speech processing architecture receives the audio data, the components of the speech processing architecture, including the LM, may initiate speech processing and may determine a domain associated with voice command. Example domains include smart home, content output, weather, information retrieval, etc.

Based on intent data or otherwise speech processing results from the LM, the preferred speech processing architecture may determine an applicable domain associated with the voice command. In examples, the intent data may include supplementary information associated with the domain. For example, the intent data could identify a request related to an audio-playback domain, but could also include identifying information for the audio to be played, the location to output the audio, etc. In examples, once the domain has been determined, an action plan executor may utilize the intent data, including the supplemental information in examples, to determine what actions to take, what devices to be used, and how the devices may be used in order to satisfy the intent data.

To determine how to accurately respond to a voice command, the LM may utilize a domain application programming interface (API) associated with the domain. Once the domain API is determined, the preferred speech architecture may determine if the domain API is configured to interface with an application-based second speech processing architecture. In examples where the domain API is configured to interface with an application-based second speech processing architecture, the domain API may identify the application associated with the domain. An application interaction service may then utilize the domain API to send a request to the application associated with the domain API for the application to generate a speech processing result. The application may utilize historical data and/or trained models associated with the application to determine a response to the voice command.

Once speech processing results are determined by the application, a directive would typically be sent to a device for performance of an action associated with the voice command. However, instead of the directive being sent to a device, the directive may be sent to a directive sink, which may be queried by the interaction service for the directive. Additionally, or alternatively, the application interaction service may submit a synthesized application request directly to a domain application known to be associated with the voice command. In those examples, the domain application may send the action directive to the directive sink for future retrieval. When the application interaction service has retrieved the data and directives associated with the voice command, the application interaction service may return the data and directives to the first speech processing architecture utilizing the domain API. At this point, the LM may utilize the return data and directives to generate a modeled response to the voice command. After generating the modeled response, the first speech processing architecture may send a command to one or more devices to perform an action responsive to the voice command.

In examples where the domain API is not configured to interface with an application-based second speech processing architecture, the domain API may continue to utilize the preferred speech processing architecture to determine an answer to the voice command.

Additionally, or alternatively, the preferred speech processing architecture may produce a first speech processing result and the second speech processing architecture may produce a second speech processing result that is different than the first speech processing result. The first speech processing result may be compared to the second speech processing result, in examples, to generate a similarity value between the first speech processing result and the second speech processing result. In examples where the similarity value satisfies a threshold, the interface between the first domain API and the second speech processing architecture may be disabled or otherwise not utilized at least for a given period of time. In examples where the similarity value does not satisfy a threshold, the preferred speech processing architecture may utilize the second speech processing result instead of and/or in addition to the first speech processing result.

Additionally, or alternatively, the preferred speech processing architecture may generate a first speech processing result to a voice command and an LM configured to determine responses to voice commands may generate a second speech processing result to the voice command. In examples, the second speech processing results may be assigned a confidence value that indicates insufficient confidence that the second speech processing result is accurately associated with the voice command. With insufficient confidence that the second speech processing result is accurately associated with the voice command, the preferred speech architecture may generate a first domain API associated with the first action domain and/or may generate an interface between the domain API and the second speech processing architecture.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1A illustrates a schematic diagram of an example environment 100 for speech processing architecture interfaces. The environment 100 may include, for example, devices 102. In certain examples, the devices 102 themselves may be any one or more of a voice interface device (e.g., smart speaker devices, mobile phones, tablets, personal computers, etc.), a video interface device (e.g., televisions, set top boxes, virtual/augmented reality headsets, etc.), and/or a touch interface device (tablets, phones, laptops, kiosks, billboard, etc.). In some examples, the devices may be situated in a home, place of business, healthcare facility (e.g., hospital, doctor's office, pharmacy, etc.), in a vehicle (e.g., airplane, truck, car, bus, etc.), and/or in a public forum (e.g., shopping center, store, hotel, etc.), for example. In some nonlimiting examples, at least some of the devices 102 may be multi-modal devices that may be configured to capture audio representing user utterances and/or to capture user input by a display or otherwise.

The devices 102 may be configured to send data to and/or receive data from remote component(s) of a system 104, such as via a network 106. It should be understood that where operations are described herein as being performed by the remote component(s) of the system 104, some or all of those operations may be performed by the devices 102. It should also be understood that anytime the remote component(s) of the system 104 are referenced, that system may include any system and/or device, whether local to an environment of the devices or remote from that environment. Additionally, it should be understood that a given space and/or environment may include numerous devices. It should also be understood that when a "space" or "environment" is used herein, those terms mean an area of any size and delineation and can include but are not necessarily limited to a given room, building, or other structure, unless otherwise specifically described as such.

The devices 102 may include one or more components, such as, for example, one or more processors 108, one or more network interfaces 110, one or more microphones 112, one or more speakers 114, one or more displays 116, and/or one or more sensors 118. The microphones 112 may be configured to capture audio, such as user utterances, and generate corresponding audio data. The speakers 114 may be configured to output audio, such as audio corresponding to audio data received from another device. The displays 116 may be configured to display images corresponding to image data, such as image data received from the remote component(s) of the system 104 as well as user interface elements that may be configured to receive user input indicating selection of such user interface elements and/or provision of queries. The devices 102 may be configured to detect an environmental condition associated with the environment utilizing the sensors 118. Some example sensors 118 that may be utilized to detect conditions may include one or more microphones configured to capture audio associated with the environment in which the device is located, one or more cameras configured to capture images associated with the environment in which the device is located, one or more network interfaces configured to identify network access points associated with the environment, global positioning system components configured to identify a geographic location of the devices, Bluetooth and/or other short-range communication components configured to determine what devices are wirelessly connected to the device, device-connection sensors configured to determine what devices are physically connected to the device, user biometric sensors, and/or one or more other sensors configured to detect a physical condition of the device and/or the environment in which the device is situated. In addition to specific environmental conditions that are detectable by the sensors 118, usage data and/or account data may be utilized to determine if an environmental condition is present. In some examples, the sensors 118 may also include radar and/or ultrasonic sensors. The sensors 118 may be configured to generate context data.

It should be understood that while several examples used herein include a voice-enabled device that allows users to interact therewith via user utterances, one or more other devices, which may not include a voice interface, may be utilized instead of or in addition to voice-enabled devices. In these examples, the device 102 may be configured to send and receive data over the network 106 and to communicate with other devices in the environment 100. As such, in each instance where a voice-enabled device is utilized, a computing device that does not include a voice interface may also or alternatively be used. It should be understood that when voice-enabled devices are described herein, those voice-enabled devices may include phones, computers, and/or other computing devices.

The remote component(s) of the system 104 may include components such as, for example, a user registry 148, a first input processing architecture 150, and/or a second input processing architecture 170. It should be understood that while the components of the remote component(s) of the system 104 are depicted and/or described as separate from each other in FIG. 1A, some or all of the components may be a part of the same system. The first input processing architecture 150 may include an ASR 144 component and/or a NLU 146 component. Each of the components described herein with respect to the remote component(s) of the system 104 may be associated with their own systems, which collectively may be referred to herein as the remote component(s) of the system 104, and/or some or all of the components may be associated with a single system. Additionally, the remote component(s) of the system 104 may include one or more applications, which may be described as skills. "Skills," as described herein may be applications and/or may be a subset of an application. For example, a skill may receive data representing an intent. For example, an intent may be determined by the NLU component 146 and/or as determined from user input via a computing device. Skills may be configured to utilize the intent to output data for input to a text-to-speech (TTS) component, a link or other resource locator for audio data, and/or a command to a device, such as smart devices. "Skills" may include applications running on devices, such as the smart devices, and/or may include portions that interface with voice user interfaces of smart devices.

In instances where a voice-enabled device is utilized, skills may extend the functionality of smart devices that can be controlled by users utilizing a voice-user interface. In some examples, skills may be a type of application that may be useable in association with target devices and may have been developed specifically to work in connection with given target devices. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the voice-enabled device. The application(s) may also be utilized, in examples, to receive input, such as from a user of a personal device and/or the voice-enabled device and send data and/or instructions associated with the input to one or more other devices.

Additionally, the operations and/or functionalities associated with and/or described with respect to the components of the remote component(s) of the system 104 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

With respect to the remote component(s) of the system 104, the user registry 148 may be configured to determine and/or generate associations between users, user accounts, environment identifiers, and/or devices. For example, one or more associations between user accounts may be identified, determined, and/or generated by the user registry 148. The user registry 148 may additionally store information indicating one or more applications and/or resources accessible to and/or enabled for a given user account. Additionally, the user registry 148 may include information indicating device identifiers, such as naming identifiers, associated with a given user account, as well as device types associated with the device identifiers. The user registry 148 may also include information indicating user account identifiers, naming indicators of devices associated with user accounts, and/or associations between devices, such as the smart devices. The user registry 148 may also include information associated with usage of the smart devices. It should also be understood that a user account may be associated with one or more than one user profiles. It should also be understood that the term "user account" may be used to describe a set of data and/or functionalities associated with a given account identifier. For example, data identified, determined, and/or generated while using some or all of the environment 100 may be stored or otherwise associated with an account identifier. Data associated with the user accounts may include, for example, account access information, historical usage data, device-association data, and/or preference data.

The first input processing architecture 150 may be configured to receive audio data from the devices 102 and/or other devices and perform speech-processing operations. For example, the ASR component 144 may be configured to generate text data or other ASR output data corresponding to the audio data, and the NLU component 146 may be configured to generate intent data or other NLU output data corresponding to the audio data. In examples, intent data or other NLU output data may be generated that represents the audio data, such as without the generation and/or use of text data or other ASR output data. The intent data or other NLU output data may indicate a determined intent associated with the user utterance as well as a payload and/or value associated with the intent. For example, for a user utterance of "how old is Actor A," the NLU component 146 may identify a "information retrieval" intent. In this example where the intent data or other NLU output data indicates an intent to retrieve information associated with Action A, the first input processing architecture 150 may call one or more applications to effectuate the intent. Skills, as described herein may otherwise be described as applications and may include functionality for utilizing intent data or other NLU output data to generate directives and/or instructions.

The components of the environment 100 are described below by way of example. To illustrate, the device 102 may receive audio representing a given voice command. Audio data corresponding to the voice command may then be sent from the device 102 to components of the first input processing architecture 150 for speech processing. The first input processing architecture 150 may typically perform ASR processes (using the ASR component 144) and/or NLU processes (using the NLU component 146) to determine intent data associated with the voice command and then to utilize that intent data to determine an action to be performed responsive to the voice command. Alternatively, or additionally, the device itself may have a speech processing system configured to perform ASR and/or NLU. The intent data may indicate an intent for the voice command determined by the first input processing architecture 150. The intent data may be sent to the LM 152 or the second input processing architecture 170, including one or more domain applications 172.

At this point the voice command may be determined to be associated with a known user in a user registry 148. The identified user's communication preferences may be known and may be utilized to aid the first input processing architecture 150 or the second input processing architecture 170 in determining intent data. For example, the user's communication preferences could include a unique vernacular associated with the user that includes multiple definitions for similar words, alternate pronunciations for known words, or words and phrases specifically associated with known actions. Additionally, the user's communication preferences could also include the user's preferred communication delivery methods and devices 102 associated with the user. For example, the communication delivery method preferences could include a preference to only provide audible responses in certain areas during specified hours of the day. The user registry 148 may also include device information associated with the user, which would aid in determining a communication delivery method for the user. For example, if the user issued a voice command for information, the requested information could be displayed on the user's phone, tablet, or laptop instead of a device that is common to all users in the user registry 148.

In examples, various speech processing models and historical response data, along other data, may be developed over time to more accurately respond to voice commands. However, as additional and/or different technologies are developed that are associated with speech processing, other potentially preferred speech processing architectures may be desirable. One example of a preferred speech processing architecture might include a LM 152, and an example of a secondary processing architecture may be a legacy application-based system where individual domain applications 172 associated with individual domains are called to determine responses to voice commands. In circumstances where there is a preferred speech processing architecture, a given device may receive audio representing a voice command, and the device 102 may be configured to send the audio data directly to the preferred speech processing architecture for speech processing. When the preferred speech processing architecture receives the audio data, the components of the first input processing architecture 150, including the LM 152, the action plan executor 154, domain API service, 156, application interaction service 158, and directive sink 160, may initiate speech processing and may determine a domain associated with voice command. Example domains include smart home, content output, weather, information retrieval, etc.

Based on intent data or otherwise speech processing results from the LM 152, the preferred speech processing architecture may determine an applicable domain associated with the voice command. In examples, the intent data may include supplementary information associated with the domain. For example, the intent data could identify a request related to an audio-playback domain, but could also include identifying information for the audio to be played, the location to output the audio, etc. In examples, once the domain has been determined, an action plan executor 154 may utilize the intent data, including the supplemental information in examples, to determine what actions to take, what devices 102 to be used, and how the devices 102 may be used in order to satisfy the intent data.

To determine how to accurately respond to a voice command, the LM 152 may utilize a domain API service 156 to determine a domain API associated with the domain. Once the domain API is determined, the preferred speech architecture may determine if the domain API is configured to interface with an application-based second speech processing architecture. In examples where the domain API is configured to interface with an application-based second speech processing architecture, the domain API may identify the application associated with the domain. The application interaction service 158 may then utilize the domain API service 156 to send a request to the application associated with the domain API for the application to generate a speech processing result. The application may utilize historical data and/or trained models associated with the application to determine a response to the voice command.

Once speech processing results are determined by the application, including in examples a directive would typically be sent to a device for performance of an action associated with the voice command. However, instead of the directive being sent to a device, the directive may be sent to a directive sink 160, which may be queried by the interaction service for the directive. Additionally, or alternatively, the application interaction service 158 may submit a synthesized application request directly to a domain application 172 known to be associated with the voice command. In those examples, the domain application 172 may send the action directive to the directive sink 160 for future retrieval. When the application interaction service 158 has retrieved the data and directives associated with the voice command, the application interaction service 158 may return the data and directives to the first input processing architecture 150 utilizing the domain API. At this point, the LM 152 may utilize the return data and directives to generate a modeled response to the voice command. After generating the modeled response, the first input processing architecture 150 may send a command to one or more devices to perform an action responsive to the voice command.

In examples where the domain API is not configured to interface with an application-based second speech processing architecture, the domain API may continue to utilize the preferred speech processing architecture to determine an answer to the voice command.

In examples, multiple voice commands may be determined to be associated with one or more known users in the user registry 148. In those examples, each identified user's communication preferences may be known and may be utilized to aid the first speech processing architecture in determining intent data for the voice command associated with the identified user. For example, the user's communication preferences could include a unique vernacular associated with the user that includes multiple definitions for similar words, alternate pronunciations for known words, or words and phrases specifically associated with known actions. Additionally, the user's communication preferences could also include the user's preferred communication delivery methods and devices 102 associated with the user. For example, the communication delivery method preferences could include a preference to only provide audible responses in certain areas during specified hours of the day. The user registry may also include device information associated with the user, which would aid in determining a communication delivery method for the user. For example, if the user issued a voice command for information, the requested information could be displayed on the user's phone, tablet, or laptop instead of a device that is common to all users in the registry.

In examples, the first input processing architecture 150 may produce a first speech processing result and the second input processing architecture 170 may produce a second speech processing result that is different than the first processing result. The first speech processing result may be compared to the second processing result, in examples, to generate a similarity value between the first speech processing result and the second speech processing result. In examples where the similarity value satisfies a threshold, the interface between the first domain API and the second speech processing architecture may be disabled. In examples where the similarity value does not satisfy a threshold, the preferred speech processing architecture may utilize the second speech processing result instead of the first speech processing unit.

In examples, the preferred speech processing architecture may generate a first speech processing result to a voice command and an LM 152 configured to determine responses to voice commands may generate a second speech processing result to the voice command. In examples, the second speech processing results may be assigned a confidence value that indicates insufficient confidence that the second speech processing result is accurately associated with the voice command. With insufficient confidence that the second speech processing result is accurately associated with the voice command, the preferred speech architecture may generate a first domain API associated with the first action domain.

As used herein, the one or more processes performed by the device 102 and/or the remote component(s) of the system 104 may include the use of models. These models may be machine learning models. For example, the machine learning models as described herein may include predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases and may be utilized to predict trends and behavior patterns. In examples, the event, otherwise described herein as an outcome, may be an event that will occur in the future, such as whether presence will be detected. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Then, data may be collected and/or accessed to be used for analysis.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter, predictive modelling may be performed to generate accurate predictive models for future events. Outcome prediction may be deterministic such that the outcome is determined to occur or not occur. Additionally, or alternatively, the outcome prediction may be probabilistic such that the outcome is determined to occur to a certain probability and/or confidence.

As described herein, the machine learning models may be configured to be trained utilizing a training dataset associated with prior user input data. The models may be trained for multiple user accounts and/or for a specific user account. As such, the machine learning models may be configured to learn, without human intervention, attributes of collected data and/or actions taken associated with device usage cessation.

It should be noted that while text data or other ASR output data is described as a type of data utilized to communicate between various components of the remote component(s) of the system 104 and/or other systems and/or devices, the components of the remote component(s) of the system 104 may use any suitable format of data to communicate. For example, the data may be in a human-readable format, such as text data or other ASR output data formatted as XML, SSML, and/or other markup language, or in a computer-readable format, such as binary, hexadecimal, etc., which may be converted to text data or other ASR output data for display by one or more devices such as the devices.

As shown in FIG. 1A, several of the remote component(s) of the system 104 and the associated functionality of those components as described herein may be performed by one or more of the devices 102. Additionally, or alternatively, some or all of the components and/or functionalities associated with the devices 102 may be performed by the remote component(s) of the system 104.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 108 and/or the processor(s) described with respect to the components of the system 104, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 108 and/or the processor(s) described with respect to the components of the system 104 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108 and/or the processor(s) described with respect to the components of the system 104 may possess its own local memory, which also may store program components, program data, and/or one or more operating systems.

The memory described with respect to the components of the system 104 may include volatile and nonvolatile memory, removable and non-removable media implemented in any method or technology for storage of information, such as non-transitory computer-readable instructions, data structures, program component, or other data. Such memory described with respect to the components of the system 104 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory described with respect to the components of the system 104 may be implemented as computer-readable storage media ("CRSM"), which may be any available physical media accessible by the processor(s) 108 and/or the processor(s) described with respect to the system 104 to execute instructions stored on the described with respect to the components of the system 104. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as the memory described with respect to the components of the system 104, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 110 and/or the network interface(s) described with respect to the components of the system 104 may enable messages between the components and/or devices shown in environment 100 and/or with one or more other polling systems, as well as other networked devices. Such network interface(s) 110 and/or the network interface(s) described with respect to the components of the system 104 may include one or more network interface controllers (NICs) or other types of transceiver devices to send and receive messages over the network 106.

For instance, each of the network interface(s) 110 and/or the network interface(s) described with respect to the components of the system 104 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 110 and/or the network interface(s) described with respect to the components of the system 104 may include a wide area network (WAN) component to enable message over a wide area network.

In some instances, the remote component(s) of the system 104 may be local to an environment associated the devices. For instance, the remote component(s) of the system 104 may be located within one or more of the first user devices 102 and/or the smart devices. In some instances, some or all of the functionality of the remote component(s) of the system 104 may be performed by one or more of the devices. Also, while various components of the system 104 have been labeled and named in this disclosure and each component has been described as being configured to cause the processor(s) to perform certain operations, it should be understood that the described operations may be performed by some or all of the components and/or other components not specifically illustrated. It should be understood that, in addition to the above, some or all of the operations described herein may be performed on a phone or other mobile device and/or on a device local to the environment, such as, for example, a hub device and/or edge server in a home and/or office environment, a self-driving automobile, a bus, an airplane, a camper, a trailer, and/or other similar object having a computer to perform its own sensor processing, etc.

Figure 1B:
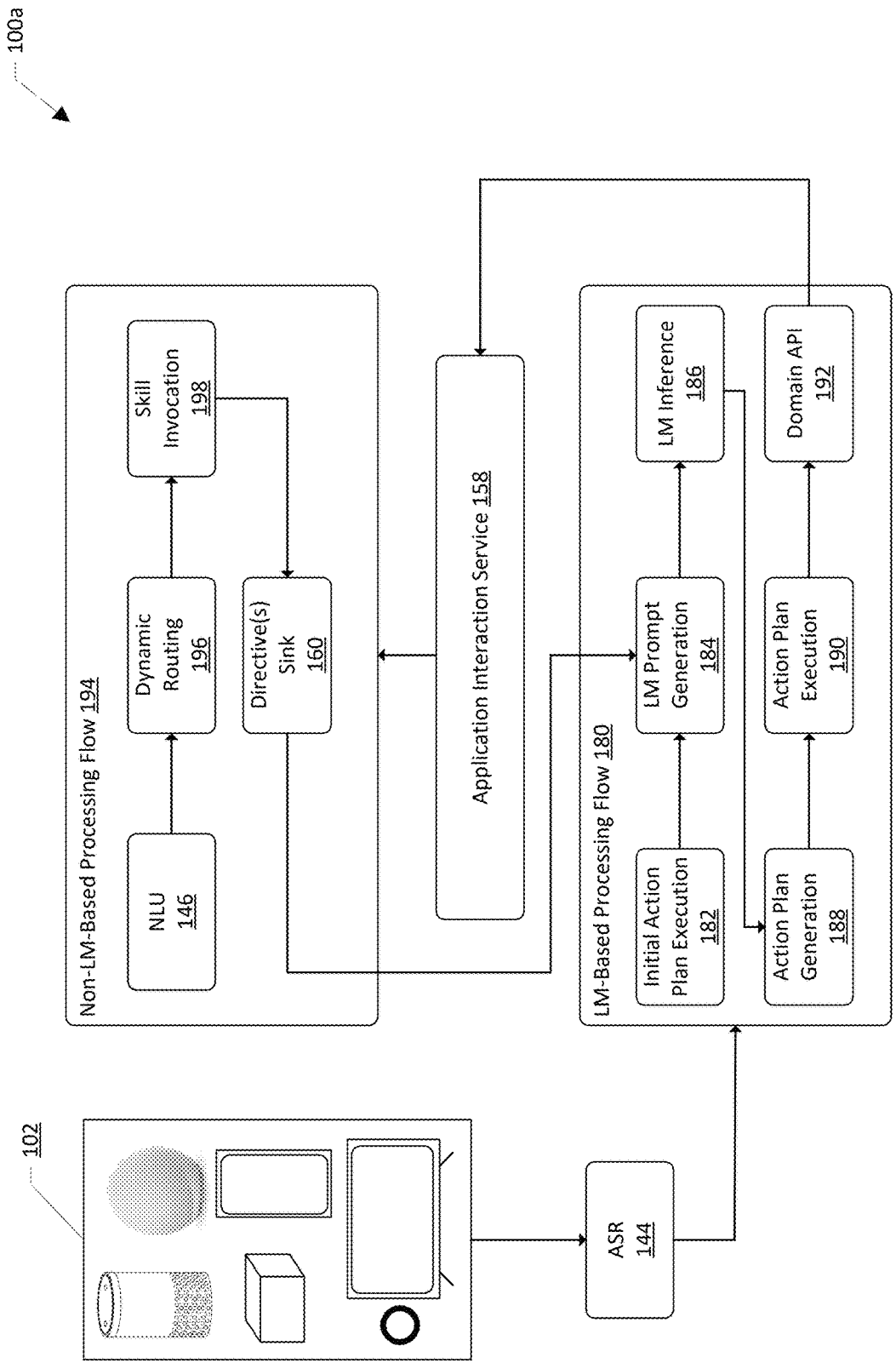
FIG. 1B illustrates a schematic diagram of an example environment utilizing multiple input processing architectures.

FIG. 1B illustrates a schematic diagram of an example environment for multiple speech processing architecture interfaces. The LM-based processing flow and non-LM-based processing flow described in FIG. 1B may be the same or similar to the first speech processing architecture and the second speech processing architecture described in FIG. 1A. Additionally, FIG. 1B depicts devices, ASR, NLU, an application interaction service, a directive sink, and a domain API. The devices may be the same or similar to the devices 102 described in FIG. 1A. Additionally, The ASR may be the same or similar to the ASR 144 described with respect to FIG. 1A. The NLU may be the same or similar to the NLU 146 described with respect to FIG. 1A. The application interaction service may be the same or similar to the application interaction service 158 described with respect to FIG. 1A. The directive sink may be the same or similar to the directive sink 160 described with respect to FIG. 1A. The domain API may be the same or similar to the domain API 192 described with respect to FIG. 1A.

The components of the environment are described below by way of example. To illustrate, the device 102 may receive audio representing a given voice command. Audio data corresponding to the voice command may then be sent from the device 102 to the ASR component 144 to determine intent data associated with the voice command and then to utilize that intent data to determine an action to be performed responsive to the voice command. Alternatively, or additionally, the device itself may have a speech processing system configured to perform ASR. The intent data may indicate an intent for the voice command determined by the LM-based processing flow 180. The intent data may be sent to the LM 152 or the non-LM-based processing flow 194, including one or more domain applications 172.

The ASR component 144 may generate ASR output data (e.g., text) that may represent a transcription of a spoken user request. The ASR component 144 may then send the output data to the LM-based processing flow 180. The LM-based processing flow 180 may then utilize the initial action plan execution component 182 to generate an initial action plan determined to be sufficient to satisfy the requests within the intent data. At this point, the LM-based processing flow 180 may access the directive(s) sink 160 in instances where the domain API 192 in question is configured to interface with the non-LM-based processing flow in order to acquire directives for executing the initial action plan and/or for determining whether the initial action plan or a different action plan based on the directive(s) should be utilized. In other examples, the LM prompt generation component 184 may provide the initial action plan, including any directives received from the directive(s) sink 160, as an input (the LM inference component 186) to generate an action plan (188). To do so, the application interaction service 158 may receive a request from the domain API 192, the application interaction service 158 may call the non-LM-based processing flow 194 to perform speech processing for the utterance. This process may include performing NLU 146 as described herein, utilizing the dynamic routing 196 to determine what applications (otherwise described herein as skills and/or speechlets) should be utilized, and invoking the selecting application/skill/speechlet (denoted as skill invocation 198 in FIG. 1B). The skill may determine one or more directives that may be sent to the directive(s) sink before being called by the application interaction service 158 for provision to the LM-based processing flow 180. By so doing, the LM-based processing flow 180 may proceed with determining an action to perform responsive to a user utterance when such utterances are received, and the LM-based processing flow 180 may arbitrate between the action determined by the LM-based processing flow 180 in the generated action plan and the directive(s) received from the non-LM-based processing flow 194 to determine what action to take.

Figure 2:
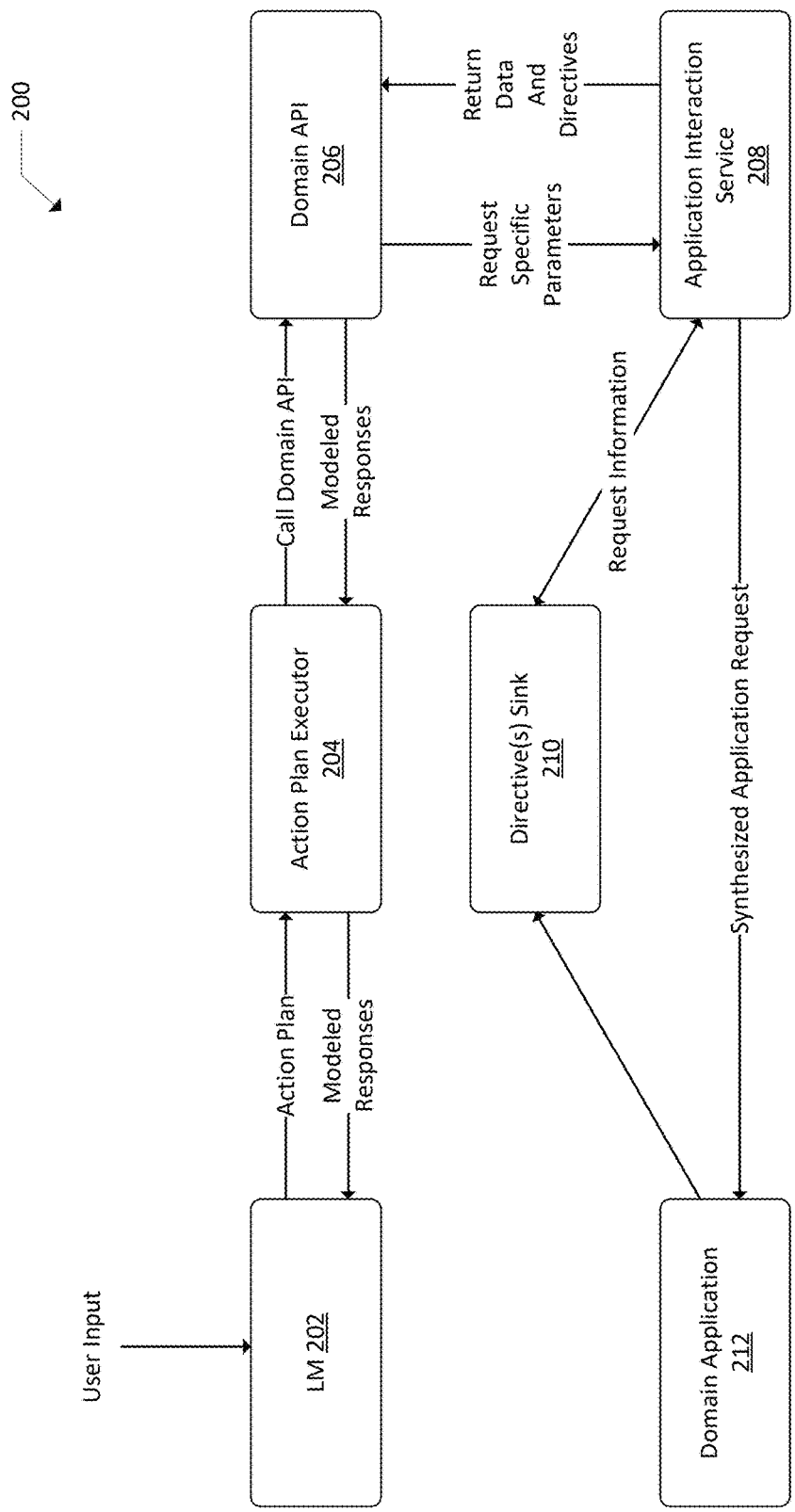
FIG. 2 illustrates a conceptual diagram of a first input processing architecture and a second input processing architecture.

FIG. 2 illustrates a conceptual diagram of a first speech processing architecture and a second speech processing architecture. The first speech processing architecture and second speech processing architecture described in FIG. 2 may be the same or similar to the first speech processing architecture and the second speech processing architecture described in FIG. 1A. Additionally, FIG. 2 depicts an LM, an action plan executor, an application interaction service, a directive sink, and a domain application. The LM may be the same or similar to the LM 152 described with respect to FIG. 1A. The action plan executor may be the same or similar to the action plan executor 154 described with respect to FIG. 1A. The application interaction service may be the same or similar to the application interaction service 158 described with respect to FIG. 1A. The directive sink may be the same or similar to the directive sink 160 described with respect to FIG. 1A. The domain application may be the same or similar to the domain application 172 described with respect to FIG. 1A.

To start, when the preferred speech processing architecture receives the audio data, the components of the speech processing architecture, including the LM 202, may initiate speech processing (where ASR may be utilized to generate text data that may be utilized by the LM 202) and may determine an action plan. The action plan may include determining a domain, or domains, associated with a voice command, a domain API for individual domains, and parameters to satisfy the voice command. The LM 202 may utilize the action plan executor 204 to execute the action plan. For example, the LM 202 may receive the request "play a movie in the living room." The LM 202 may determine that multiple domains may be associated with the request and generate an action plan to satisfy the request. After generating the action plan, the action plan executor 204 may utilize the action plan to determine one or more API calls to make to one or more domain APIs. For example, the action plan executor 204 may take the action plan generated by the LM 202 and generate a call to the appropriate domain API 206 as necessary to execute the action plan. Example domains include smart home, content output, weather, information retrieval, etc. To continue the example, the applicable domains may include home lighting, audio playback, temperature controls, etc.

In examples, the action plan executor 204 may request supplementary information associated with the domain in question. For example, the results could identify a request related to an information retrieval domain, but could also include identifying processes for the information to be presented, the location to output the information, etc. For example, the information requested could be a recipe that must be displayed on a particular device screen, or the information requested could be the answer to a trivia question that must be presented through audio-playback on a specific device. In examples, the LM 202 may receive the supplementary information with the request and generate an action plan that takes into account the supplementary information to determine what actions to take, what devices to be used, and how the devices may be used in order to satisfy the request. The action plan executor 204 may then be utilized to call the appropriate domain API 206 in order execute the action plan pursuant to the supplementary information.

To determine how to accurately respond to a voice command, the action plan executor 204 may utilize the action plan to determine a final call to the domain API 206 by translating the action that was identified by the action plan into a usable command for the domain API 206. Once the domain API 206 received the usable command from the action plan executor 204, an application interaction service 208 may then utilize the domain API 206 to either send a request to the domain application 212 associated with the domain API for the application to generate a speech processing result, or request information directly from the directive(s) sink 210. If requested directly to the domain application 212, the domain application 212 may utilize historical data and/or trained models associated with the application to determine a response to the voice command.

Once the domain application 212 has identified an appropriate directive in response to the request, the directive would typically be sent back to the application interaction service 208. However, instead of the directive being sent directly to the application interaction service 208, the directive may be sent to a directive(s) sink 210. In those examples, the domain application 212 may send the action directive to the directive(s) sink 210 for future retrieval. When the application interaction service 208 has retrieved the data and directives associated with the voice command, the application interaction service 208 may return the data and directives to the first speech processing architecture utilizing the domain API 206. At this point, the LM 202 may utilize the return data and directives to generate a modeled response to the voice command. After receiving the modeled response, the action plan executor 204, based on the action plan, may call other components of the first speech processing architecture to effectuate the action plan as determined utilizing the results from the second speech processing architecture. For example, if the action plan includes a voice response, the action plan may include invoking a text-to-speech (TTS) engine. At that point the action plan executor 204 may finalize and execute the call to the TTS engine that will go to the user device.

Figure 3:
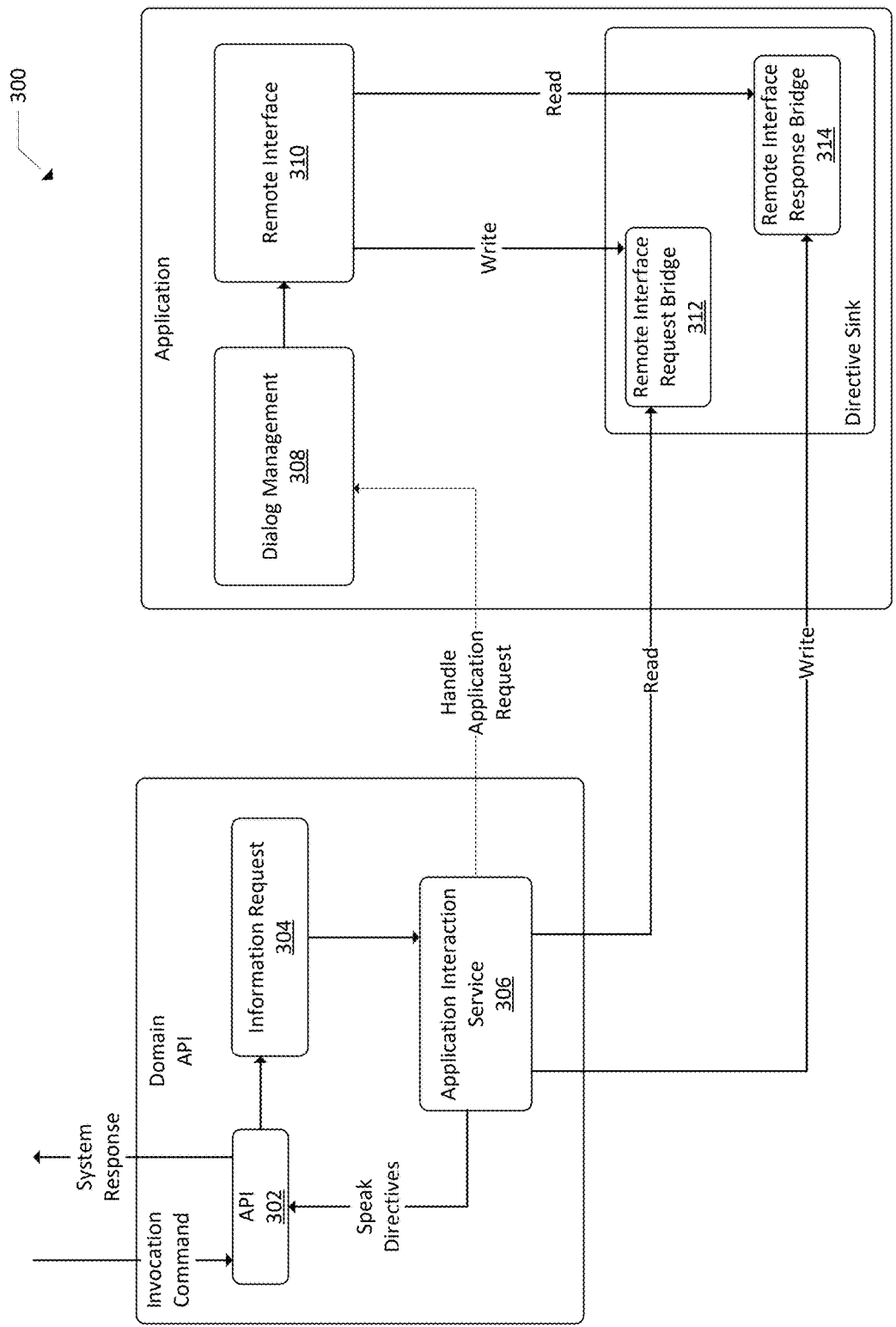
FIG. 3 illustrates a conceptual diagram of components utilized to process a voice command utilizing a first input processing architecture and a second input processing architecture.

FIG. 3 illustrates a conceptual diagram of components utilized to process a voice command utilizing a first speech processing architecture and a second speech processing architecture. The directive sink described in FIG. 3 may be the same or similar to the directive sink 160 described in FIG. 1A. Additionally, FIG. 3 depicts an application. The application described in FIG. 3 may be the same or similar to the domain application(s) 172 described in FIG. 1A.

To determine how to accurately respond to a voice command, the first input processing architecture 150 may utilize an API associated with the domain. After an invocation command is received, an API 302 within the domain API, may generate and/or send an information request to the application interaction service 306. The information request may be formatted to be usable by the application interaction service 306. As described above, the application interaction service 306, utilizing the formatted data, may: (1) make a direct request to the dialog management component 308 of the application; (2) read from the remote interface request bridge 312 of the directive sink; or (3) write to the remote interface response bridge 314 of the directive sink.

If the application interaction service 306 makes a direct request to the dialog management component 308 of the application, the dialog management component 308 may interact with the remote interface component 310 of the application before either reading from the remote interface request bridge 312 of the directive sink or writing to the remote interface response bridge 314 of the directive sink. In either case, the response to the direct request may be deposited into the directive sink. If the appropriate response associated with the request is already in the directive sink, the application interaction service 306 may retrieve the known response from the remote interface request bridge 312.

When the API 302 has retrieved the data and directives associated with the invocation command, the API 302 may return the system response. In this example, the LM 202 may utilize the system response to determine what action is to be performed responsive to the invocation command. By way of example, the directive determined by the second speech processing architecture may be for a given device, say for example a smart home device, to transition from one device state to another device state, say for example from an off state to an on state. The LM 202 may utilize this information to determine that the same directive should be sent to the smart home device to cause the device state transition. In other examples, the LM 202 may utilize the directive as one of potentially many inputs to more accurately determine what action should be selected. For example, the LM 202 may determine that the directive from the second speech processing architecture has identified the device state change transition accurately (has satisfied a threshold degree of confidence of accuracy) but that the device to perform the state change is potentially not accurate. The LM 202 may then utilize other information available to the LM 202, such as information available to the domain API 206, to determine that a different device should be caused to perform the action.

Figure 4:
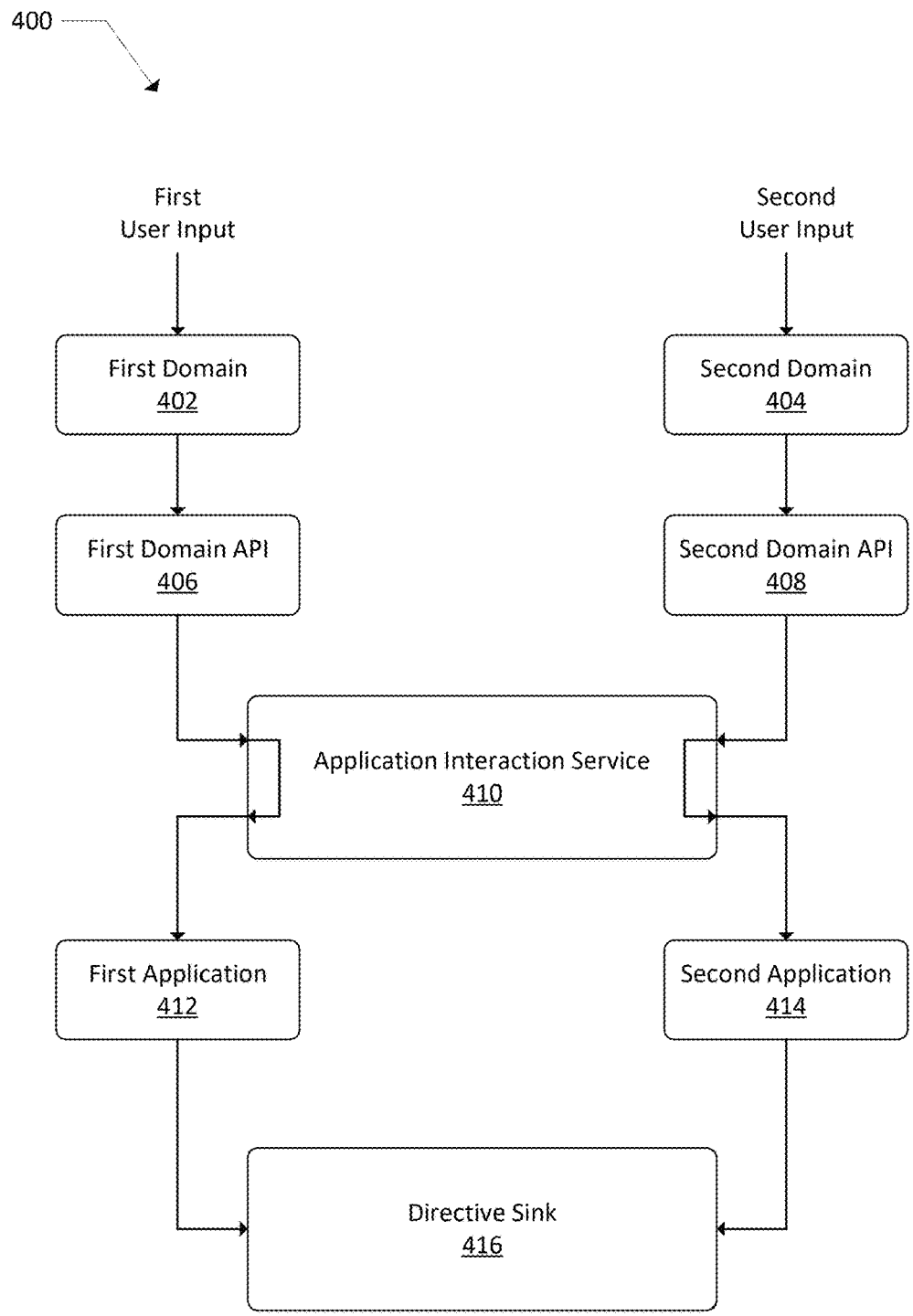
FIG. 4 illustrates a conceptual diagram of components utilized to process multiple user inputs using various components of input processing architectures depending on domains associated with the user inputs.

FIG. 4 illustrates a conceptual diagram of components utilized to process voice commands using a speech processing architecture. The directive sink described in FIG. 4 may be the same or similar to the directive sink 160 described in FIG. 1A and/or the directive(s) sink 210 described in FIG. 2. Additionally, FIG. 4 depicts a domain application. The domain application described in FIG. 4 may be the same or similar to the domain application 206 described in FIG. 2. Additionally, FIG. 4 depicts an application. The application described in FIG. 4 may be the same or similar as the domain application 172 depicted in FIG. 1A and/or the domain application 212 described in FIG. 2.

A device may receive multiple audio inputs that represent first voice command and a second voice command. Typically, the first voice command and the second voice command are processed to determine first intent data and second intent data, respectively, utilizing one or more speech processing architectures. When the one or more speech processing architectures receive the first intent data and the second intent data, the speech processing architectures may determine a first domain 402 associated with the first voice command. and the second domain 404 associated with the second voice command. Example domains include smart home, audio output, weather, information retrieval, messaging, etc. In examples, the intent data may include supplementary information associated with the domain. For example, the intent data could identify a request related to an audio-playback domain, but could also include identifying information for the audio to be played, the location to output the audio, etc. In examples, once the domain has been determined, an action plan executor may utilize the intent data, including the supplemental information in examples, to determine what actions to take, what devices to be used, and how the devices may be used in order to satisfy the intent data.

Once the first domain 402 and the second domain 404 have been determined, the first domain 402 and second domain 404 may utilize a first domain API 406 and second domain API 408 associated with the first domain 402 and second domain 404, respectively. Once the first domain API 406 and the second domain API 408 have been determined, the speech processing architectures may determine if the first domain API 406 and the second domain API 408 are configured to interface with an application-based second speech processing architecture by utilizing a voice interaction service 410. In examples where the first domain API 406 and the second domain API 408 are configured to interface with an application-based second speech processing architecture, the first domain API 406 and the second domain API 408 may identify a first application 412 associated with the first domain 402 and a second application 414 associated with the second domain 404, respectively. The application interaction service 410 may then utilize the first domain API 406 and the second domain API 408 to send a request to the first application 412 associated with the first domain API 406 and the second application 414 associated with the second domain API 408 for the first application 412 and the second application 414 to generate a speech processing result. The first application 412 and the second application 414 may utilize historical data and/or trained models associated with the first application 412 and the second application 414 to determine a response to the first voice command and the second voice command.

Once speech processing results are determined by the first application 412 and the second application 414, including in examples, a directive would typically be sent to a device for performance of an action associated with the voice command. However, instead of the directive being sent to a device, the directive may be sent to a directive sink 416, which may be queried by the voice interaction service 410 for the directive. In those examples, first domain 402 and a second application 414 may send the action directive to the directive sink for future retrieval. By so doing, in nonlimiting examples, some or each of the various domains associated with a first speech processing architecture may be associated with their own domain APIs and functionality for determining whether the domain APIs are configured to interface with the second speech processing architecture and how to interface therewith. If given domain APIs are configured to interface with the second speech processing architecture, a common voice interaction service may be utilized to receive requests from the domain APIs and to send such requests to appropriate applications of the second speech processing architecture to generate speech processing results.

FIGS. 5-9 illustrate processes associated with speech processing architecture interfaces. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1A-4 and 10-15, although the processes may be implemented in a wide variety of other environments, architectures and systems.

Figure 5:
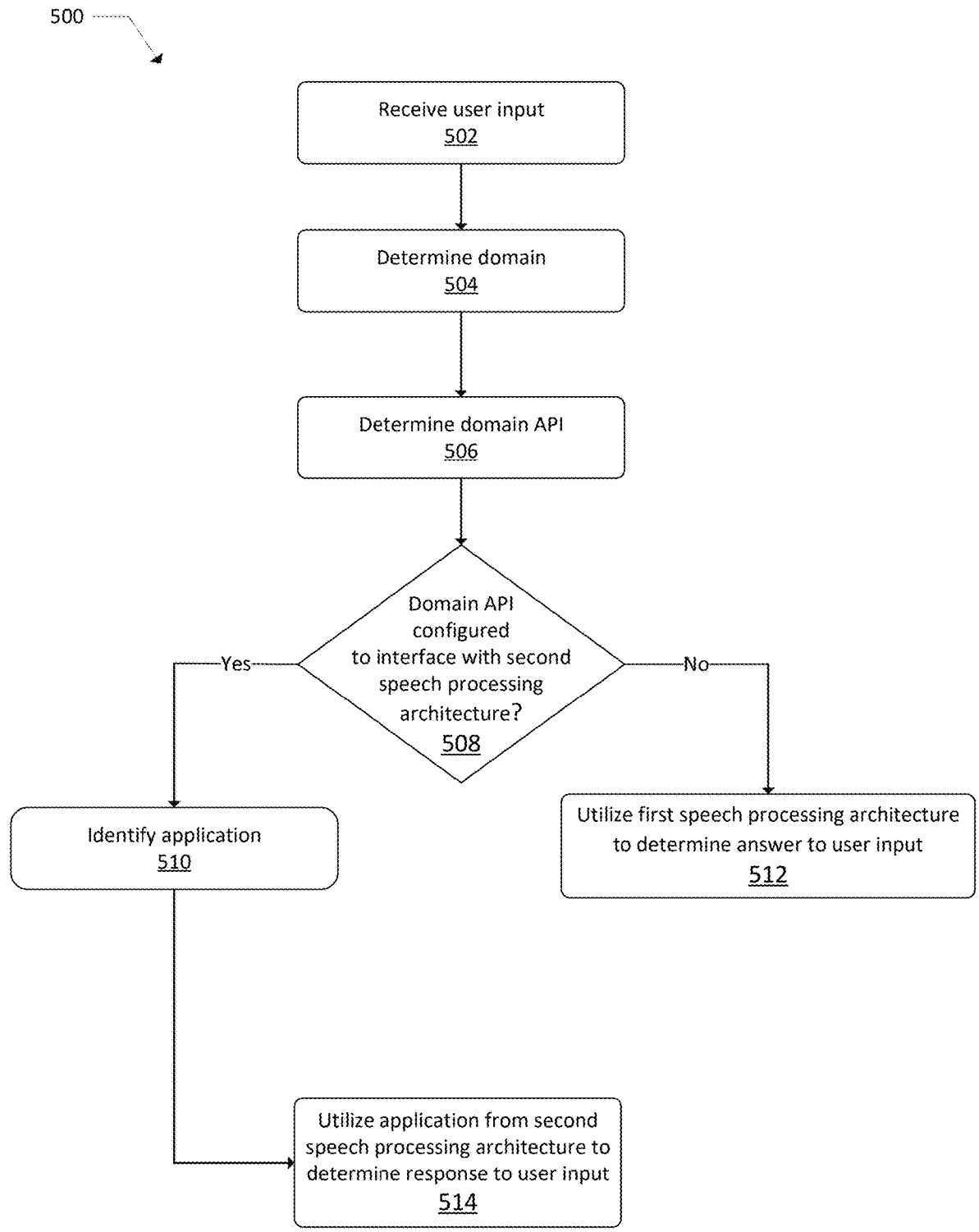
FIG. 5 illustrates a flow diagram of an example process associated with input processing architecture interfaces where a domain API is identified and a second input processing architecture is called when the domain API is configured to interface with the second input processing architecture.

FIG. 5 illustrates a flow diagram of an example process 500 for utilizing a speech processing system with a first speech processing architecture and a second speech processing architecture. The order in which the operations or steps are described is not intended to be construed as a limitation, and any number of the described operations may be combined in any order and/or in parallel to implement process 500.

At block 502, the process 500 may include receiving audio representing a voice command. For example, the device 102 may receive audio at the microphones 112 representing a voice command. The microphones may generate audio data representing the audio.

At block 504, the process 500 may include determining a domain. For example, when a first speech processing architecture receives the audio data, the components of the speech processing architecture, including the LM, may initiate speech processing and may determine a domain associated with voice command. Example domains include smart home, content output, lighting adjustments, entertainment display, etc.

At block 506, the process 500 may include determining a domain API. For example, the LM may utilize an API associated with the domain to determine how to accurately respond to a voice command. For example, if the LM received a voice command requesting to play a song, the domain API associated with the audio-playback domain may be utilized to determine whether the information and hardware necessary to carry out the request were present and functional.

At block 508, the process 500 may include determining whether the domain API is configured to interface with a second application-based speech processing architecture. For example, if the intent data associated with a voice command requested turning out the living room lights and the domain was determined to be a smart home domain, the smart home domain may be associated with a smart home API. In some examples, that smart home API may be preconfigured to interface with the second speech processing architecture or otherwise be configured to communicate with the voice interaction service.

In examples where the domain API is not configured to interface with the second application-based speech processing architecture, the process 500 may include, at block 512, utilizing a first speech processing architecture to determine an answer to the voice command. For example, if the voice command to turn out the living room lights was received and the domain API associated with smart home lighting was not configured to interface with the second speech processing architecture, then the interface between the first speech processing architecture and the second speech processing architecture would be disabled and a no search for an applicable application would begin.

In examples where the domain API is configured to interface with a second application-based speech processing architecture, the process 500 may include, at block 510, identifying an application to be utilized by the second speech processing architecture. For example, if the voice command to turn out the living room lights was received and the domain API associated with smart home lighting were configured to interface with the second speech processing architecture, then the interface between the first speech processing architecture and the second speech processing architecture would be maintained and an applicable application would be identified to carry out the request.

At block 514, the process 500 may include utilizing the application from the second speech processing architecture to determine an answer to the voice command. For example, if the request for the living room lights to be turned off were received, historical data and the trained model associated with the application may be utilized to determine specific details that the user may have intended by providing supplemental contextual information surrounding the request. Specific details may include whether light sources adjacent to the living room that emit light into the living room should also be turned out, the physical condition of the lighting system and whether the lighting system can be safely manipulated, etc.

Figure 6:
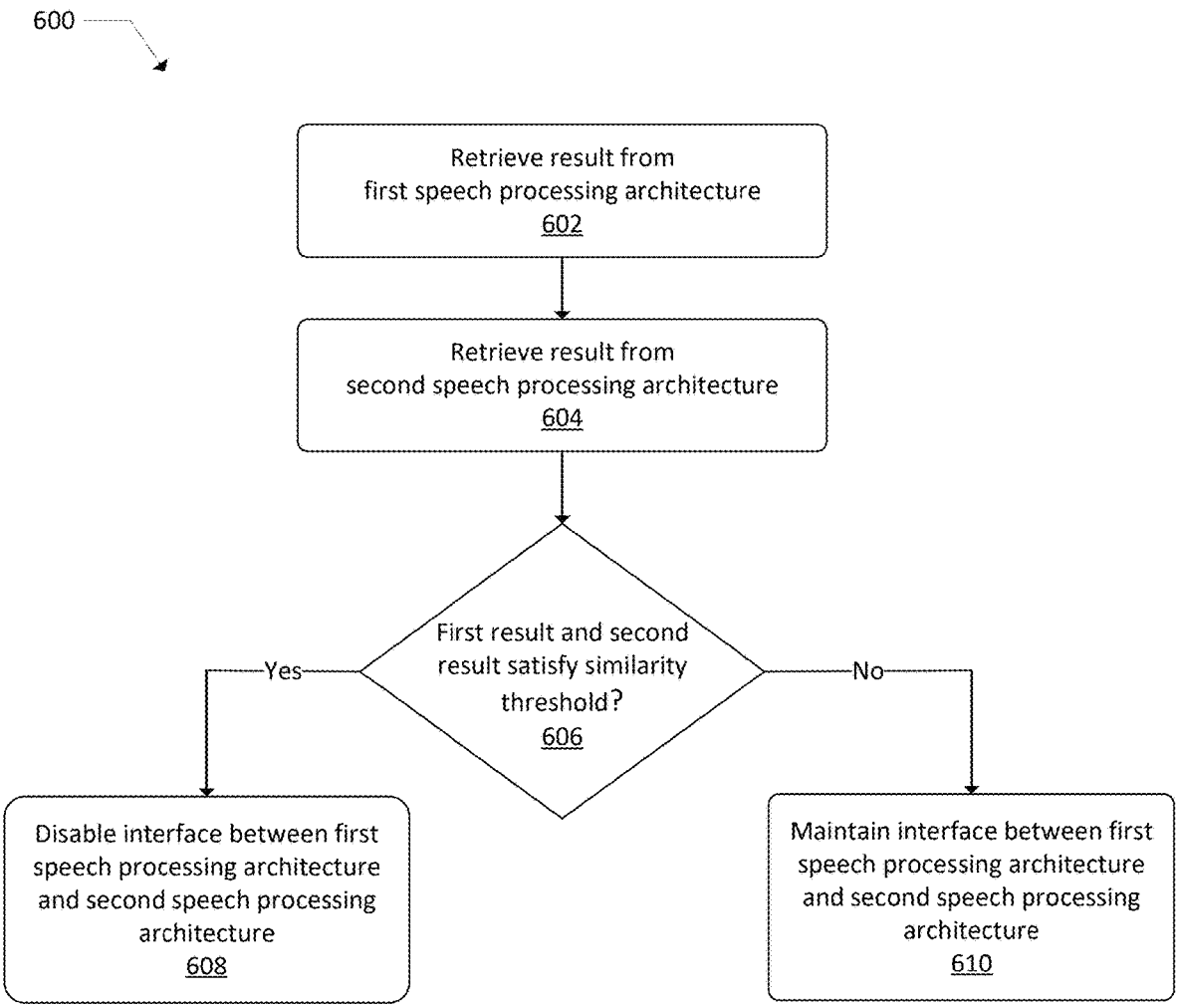
FIG. 6 illustrates a flow diagram of an example process for determining when to disable interfaces between input processing architectures.

FIG. 6 illustrates a flow diagram of an example process 600 for comparing speech processing results from a first speech processing architecture and a second speech processing architecture. The order in which the operations or steps are described is not intended to be construed as a limitation, and any number of the described operations may be combined in any order and/or in parallel to implement process 600.

At block 602, the process 600 may include retrieving a result from first a first speech processing architecture. For example, the first speech processing architecture could have interpreted the voice command "put on Team A game" as turning on the television and turning the television to show a documentary for Team A.

At block 604, the process 600 may include retrieving a result from a second speech processing architecture. For example, the second speech processing architecture could have interpreted the voice command "put on the Team A game" as turning on the television and turning the television to show a Team A football game.

At block 606, the process 600 may include determining whether the first result and the second result satisfy a similarity threshold. For example, the first result can be evaluated and graded with various markers, and the second result can also be evaluated and graded with various markers. The first marked results and the second marked results can then be compared by utilizing the various markers. The comparison data may be issued a similarity value score from 1 to 5, based on the comparison data, with 1 indicating little to no common markers and 5 indicating a very high percentage of common markers. With a threshold similarity value of 4, only those speech processing results determined to have a similarity value of 4, indicating a high percentage of common markers, or 5, indicating a very high percentage of common markers, will be determined to satisfy the similarity threshold. It should be understood that the scoring and/or scale are provided by way of nonlimiting example and that other comparisons, scores, scales, and/or thresholds are disclosed herein.

In examples where the result from first the first speech processing architecture and the result from the second speech processing architecture satisfy a similarity threshold, the process 600 may include, at block 608, disabling the interface between the first speech processing architecture and the second speech processing architecture. For example, if both the first speech processing architecture and the second speech processing architecture interpreted the voice command "put on the Team A game" as turning on the television and turning the television to show a Team A football game, the similarity threshold may have been met. Accordingly, the second speech processing architecture would not be needed.

In examples where the result from first the first speech processing architecture and the result from the second speech processing architecture do not satisfy the similarity threshold, the process 600 may include, at block 610, maintaining the interface between the first speech processing architecture and the second speech processing architecture. For example, if the first speech processing architecture could have interpreted the voice command "put on the Team A game" as turning on the television and turning the television to show a documentary for Team A and the second speech processing architecture could have interpreted the voice command "put on the Team A game" as turning on the television and turning the television to show a Team A football game. In those examples, the two speech processing results do not satisfy the similarity threshold, thus the interface may be utilized between the first speech processing architecture and the second speech processing architecture, including the applications associated with the second speech processing architecture.

Figure 7:
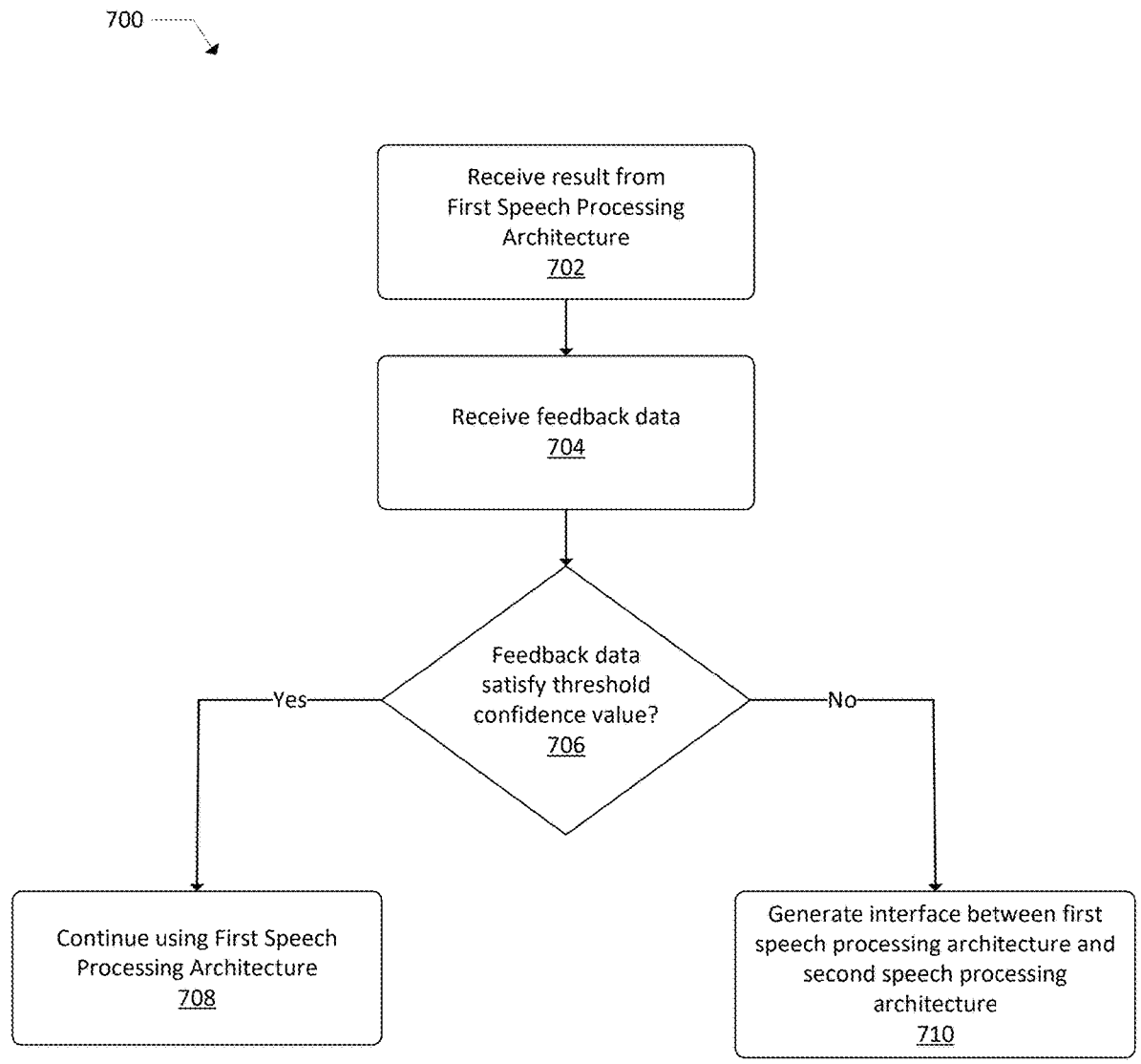
FIG. 7 illustrates a flow diagram of an example process for determining when to generate an interface between multiple input processing architectures.

FIG. 7 illustrates a flow diagram of an example process 700 for evaluating the speech processing results from a first speech processing architecture. The order in which the operations or steps are described is not intended to be construed as a limitation, and any number of the described operations may be combined in any order and/or in parallel to implement process 700.

At block 702, the process 700 may include retrieving a speech processing result from a first speech processing architecture. For example, the first speech processing architecture receives the voice command "how do I put on a tie," and the first speech processing architecture processes the request and the speech processing results are instructions for railroad construction.

At block 704, the process 700 may include receiving feedback based on the speech processing result from the first speech processing architecture. Feedback may be provided by the requesting user. For example, the user may be known in the user registry 148 and may provide an audio response to the instructions for railroad construction by saying "who cares about a railroad tie? I need to know how to tie a double windsor knot." Feedback may also be provided by another user. Following the same example, when instructions for railroad construction are displayed, a different user (either known or unknown in the user registry 148) may provide feedback with an audio response by saying "necktie, not a railroad tie." In examples, the system itself may provide feedback to indicate whether the speech processing results accurately responded to the voice command. For example, the first speech processing architecture received the voice command "what will make this room feel brighter" from a known user in the registry. If historical data and responses from a trained model indicated that the known user was an interior designer and/or makes several request with a similar unique vernacular, the system would be able to provide feedback to speech processing results suggesting the use of brighter light bulbs.

At block 706, the process 700 may include whether the feedback data satisfies a threshold confidence value. For example, speech processing result data may be issued a confidence value score from 1 to 5, based on the feedback data, with 1 being likely inaccurate and 5 being likely accurate. With a threshold confidence value of 4, only those speech processing results determined to be 4-probably accurate and 5-likely accurate will be determined to satisfy the threshold confidence value. It should be understood that the scoring and/or scale are provided by way of nonlimiting example and that other scores, scales, and/or thresholds are disclosed herein.

In examples where the feedback data satisfies a threshold confidence value, the process 700 may include, at block 708, continuing to utilize the first speech processing architecture. For example, the first speech processing architecture, without interfacing with the second speech processing architecture, responds to the voice command "how do I put on a tie" with the audio response "are we putting on a necktie or a bowtie," and the speech processing results were determined to be likely accurate. In those examples, the LM demonstrated the ability to generate appropriate responses to a voice command independent of the second application-based speech processing architecture. Accordingly, the LM would not need to use the second speech processing architecture, and the system would be able to utilize only the first speech processing architecture.

In examples where the feedback data does not satisfy the threshold confidence value, the process 700 may include, at block 710, generating an interface between the first speech processing architecture and the second speech processing architecture. For example, the first speech processing architecture, without interfacing with the second speech processing architecture, responds to the voice command "how do I put on a tie" with the audio response "are we tying a rib roast or a chicken," and the speech processing results were determined to be likely inaccurate. In those examples, the LM has not demonstrated the ability to generate appropriate responses to a voice command independent of the second application-based speech processing architecture. Accordingly, the LM needs to utilize the second speech processing architecture to generate an appropriate response to the voice command. Once the appropriate domain and domain API were determined to be related to providing instruction for tying a necktie, one pr more applications of the second speech processing architecture could be identified that are associated with the API. Then, the voice interaction service may be configured to communicate between the domain API and the one or more applications to cause the results from those applications to be sent to the directive sink. Finally, the voice interaction service may be configured to query the directive sink for results and provide those results to the domain API. In examples, generating the interface may include identifying the domain API as a candidate for development of an interface with the application-based speech processing architecture. In these examples, a developer associated with the system may initiate development of such an interface. In other examples, generating the interface may include at least identifying processes, code, etc. from existing domain API interfaces that can be utilized to generate a new interface between the domain API in question and the application-based speech processing architecture.

FIG. 8 illustrates a flow diagram of an example process 800 for determining a response to a voice command using an input processing system with a first input processing architecture and a second input processing architecture. The order in which the operations or steps are described is not intended to be construed as a limitation, and any number of the described operations may be combined in any order and/or in parallel to implement process 800.

At block 802, the process 800 may include receiving first user input representing a first user request within a first input processing architecture, the first input processing architecture including an LM configured for determining responses to user inputs. For example, various speech processing models and historical response data, along other data, may be developed over time to more accurately respond to voice commands. However, as additional and/or different technologies are developed that are associated with input processing, other potentially preferred input processing architectures may be desirable. One example of a preferred input processing architecture might include an LM, and an example of a secondary processing architecture may be a legacy application-based system where individual applications associated with individual domains are called to determine responses to voice commands. In circumstances where there is a preferred input processing architecture, a given device may receive audio representing a voice command, and the given device may be configured to send the input data directly to the preferred input processing architecture for processing.

At block 804, the process 800 may include determining, by an LM of a first input processing architecture, a first action domain associated with a first voice command, the first action domain being one of multiple action domains utilized by the first input processing architecture to respond to voice commands. For example, when the preferred input processing architecture receives the input data, the components of the input processing architecture, including the LM, may initiate speech processing and may determine a first action plan associated with voice command. Example domains include smart home, content output, weather, information retrieval, etc.

At block 806, the process 800 may include determining a first domain API associated with a first action domain, wherein the first domain API is predefined for interfacing with a second input processing architecture that differs at least in part from the first input processing architecture, the second input processing architecture being associated with multiple applications configured to determine actions to be performed responsive to a first voice command, application of multiple applications being associated with the first domain API. For example, to determine how to accurately respond to a voice command, the LM may utilize a domain API associated with the domain. Once the domain API is determined, the preferred input architecture may determine if the domain API is configured to interface with an application-based second input processing architecture. In examples where the domain API is configured to interface with an application-based second input processing architecture, the domain API may identify the application associated with the domain. An application interaction service may then utilize the domain API to send a request to the application associated with the domain API for the application to generate an input processing result. The application may utilize historical data and/or trained models associated with the application to determine a response to the voice command.

At block 808, the process 800 may include determining, after the first action plan is determined by the LM, that the first domain API is predefined for interfacing with a second input processing architecture that differs at least in part from the first input processing architecture, the second input processing architecture being associated with multiple applications configured to determine actions to be performed responsive to the first user input, an application of the multiple applications being associated with the first domain API. Once the domain API is determined, the preferred speech architecture may determine if the domain API is configured to interface with an application-based second input processing architecture. In examples where the domain API is configured to interface with an application-based second input processing architecture, the domain API may identify the application associated with the domain. An application interaction service may then utilize the domain API to send a request to the application associated with the domain API for the application to generate a input processing result. The application may utilize historical data and/or trained models associated with the application to determine a response to the voice command.

At block 810, the process 800 may include determining, utilizing the application associated with the second input processing architecture, a first input processing result associated with the first user input, the first input processing result differing at least partially from the first action plan determined by the LM.

At block 812, the process 800 may include providing a first input processing result to the first domain API. For example, once input processing results are determined by the application, including in examples a directive that would typically be sent to a device for performance of an action associated with the voice command. However, instead of the directive being sent to a device, the directive may be sent to a directive sink, which may be queried by the interaction service for the directive. Additionally, or alternatively, the application interaction service may submit a synthesized application request directly to a domain application known to be associated with the voice command. In those examples, the domain application may send the action directive to the directive sink for future retrieval.

At block 814, the process 800 may include causing, utilizing the LM, the first input processing architecture to utilize the first domain API and the first input processing result to determine a first action to be performed responsive to the first user input. For example, when the application interaction service has retrieved the data and directives associated with the voice command, the application interaction service may return the data and directives to the first input processing architecture utilizing the domain API. At this point, the LM may utilize the return data and directives to generate a modeled response to the voice command. After generating the modeled response, the first input processing architecture may send a command to one or more devices to perform an action responsive to the voice command.

Additionally, or alternatively, the process 800 may include receiving a second voice command within the first input processing architecture. The process 800 may also include determining a second action domain associated with the second voice command, the second action domain differing from the first action domain. The process 800 may also include determining a second domain API associated with the second action domain, wherein the second domain API is predefined for interfacing with the second input processing architecture and differs from the first domain API. The process 800 may also include determining, using a second application associated with the second domain API, a second input processing result associated with the second voice command. The process 800 may also include providing the second input processing result to the second input processing architecture via the second domain API.

Additionally, or alternatively, the process 800 may include receiving, at a directive sink, data representing a directive associated with the first input processing result, the data representing the directive configured to be utilized by one or more devices for performing an action associated with the first input processing result. The process 800 may also include causing the data representing the directive to be maintained at the directive sink instead of being sent to the one or more devices based at least in part on the application being associated with the first domain API. The process 800 may also include sending, utilizing the directive sink, the data representing the directive to the first domain API.

Additionally, or alternatively, the process 800 may include receiving a second voice command within the first input processing architecture. The process 800 may also include determining a second action domain associated with the second voice command. The process 800 may also include determining a second domain API associated with the second action domain, wherein the second domain API is unassociated with the second input processing architecture. The process 800 may also include determining, using the second domain API and within the first input processing architecture, a second input processing result associated with the second voice command, wherein the second domain API is utilized to determine the second input processing result instead of the second input processing architecture based at least in part on the second domain API being unassociated with the second input processing architecture.

Figure 9:
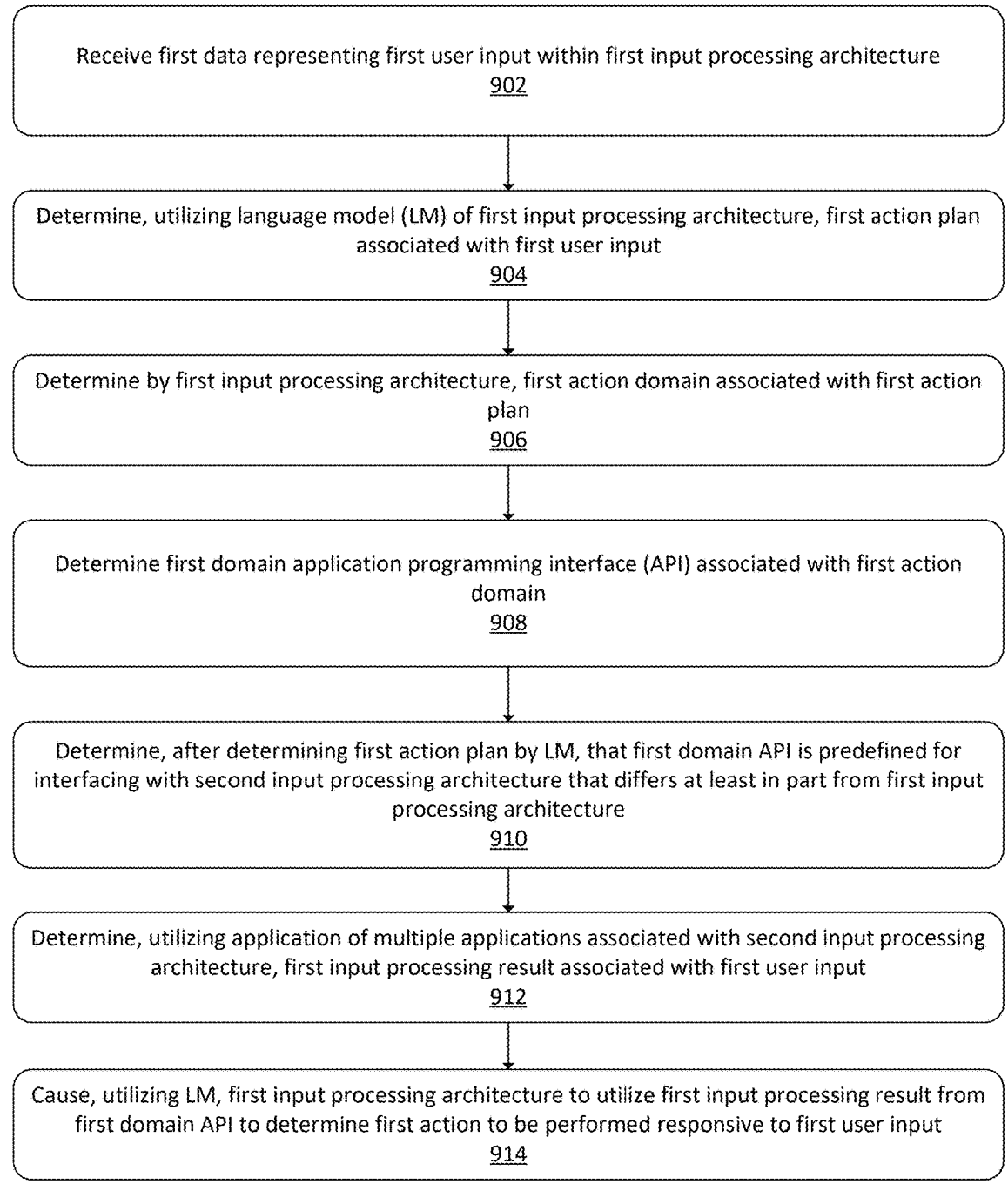
FIG. 9 illustrates a flow diagram of another example process associated with input processing architecture interfaces.

FIG. 9 illustrates a flow diagram of an example process 900 for determining a response to a voice command using a input processing system with a first input processing architecture and a second input processing architecture. The order in which the operations or steps are described is not intended to be construed as a limitation, and any number of the described operations may be combined in any order and/or in parallel to implement process 900.

At block 902, the process 900 may include receiving first data representing a first user input within a first input processing architecture. For example, in these and other scenarios, a given device may be a voice interface device that is configured to receive audio representing a voice command from a user and to generate corresponding audio data representing the voice command. Generally, the audio data may be then sent from the device to components of a input processing system for input processing. Such an input processing system may typically include a first input processing architecture that performs automatic speech recognition (ASR) processes and/or natural language understanding (NLU) processes to determine an intent associated with the voice command and then to utilize that intent to determine an action to be performed responsive to the voice command. Alternatively, or additionally, the device itself may have an input processing system configured to perform ASR and/or NLU.

At block 904, the process 900 may include determining, utilizing an LM of the first input processing architecture, a first action plan associated with the first user input. For example, when a first input processing architecture receives the a user input, the components of the input processing architecture, may utilize the LM to determine an action plan that will provide a request response appropriate to the user input. Example domains include smart home, content output, lighting adjustments, entertainment display, etc.

At block 906, the process 900 may include determining, by a first input processing architecture, a first action domain associated with the first action plan. For example, when a user requests to set a reminder, the LM may utilize the first action plan to determine an appropriate action domain associated with setting reminders.

At block 908, the process 900 may include determining a first domain API associated with the first action domain. For example, once the first action plan identifies that an action domain related to setting reminders is required, the appropriate domain API associated with the setting reminders may be determined.

At block 910, the process 900 may include determining, after determining a first action plan by the LM, that a first domain API is predefined for interfacing with a second input processing architecture that differs at least in part from the first input processing architecture. For example, after the LM determines an action plan associated with the user input, the first input processing architecture may determine that the first input processing architecture is configured to a second input processing architecture.

At block 912, the process 900 may include determining, utilizing an application of multiple applications associated with a second input processing architecture, a first input processing result associated with a first user input. For example, when the domain API associated with setting reminders identifies a domain application associated with setting reminders and determines that there is sufficient data available to launch the application, a first input processing result can be generated.

At block 914, the process 900 may include causing, utilizing the LM, the first input processing architecture to utilize a first input processing result from a first domain API to determine a first action to be performed responsive to a first user input. For example, when the application interaction service has retrieved the data and directives associated with the voice command, the application interaction service may return the data and directives to the first input processing architecture utilizing the domain API. At this point, the LM may utilize the return data and directives to generate a modeled response to the voice command. After generating the modeled response, the first input processing architecture may send a command to one or more devices to perform an action responsive to the voice command.

Additionally, or alternatively, the process 900 may include receiving a second voice command within the first input processing architecture. The process 900 may also include determining a second action domain associated with the second voice command. The process 900 may also include determining a second domain API associated with the second action domain. The process 900 may also include determining, using a second application associated with the second domain API, a second input processing result associated with the second voice command. The process 900 may also include providing the second input processing result to the second input processing architecture.

Additionally, or alternatively, the process 900 may include receiving, at a directive sink, data representing a directive associated with the first input processing result, the data representing the directive configured to be utilized for performing an action associated with the first input processing result. The process 900 may also include causing the data representing the directive to be maintained at the directive sink. The process 900 may also include sending, utilizing the directive sink, the data representing the directive to the first domain API.

Additionally, or alternatively, the process 900 may include receiving a second voice command within the first input processing architecture. The process 900 may also include determining a second action domain associated with the second voice command. The process 900 may also include determining a second domain API associated with the second action domain, wherein the second domain API is unassociated with the second input processing architecture. The process 900 may also include determining, within the first input processing architecture, a second input processing result associated with the second voice command, wherein the second domain API is utilized to determine the second input processing result.

Additionally, or alternatively, the process 900 may include identifying historical data associated with input processing results generated by the application, wherein the historical data is at least partially not available to the first input processing architecture. The process 900 may also include identifying a trained model configured to utilize the historical data to generate the input processing results, wherein the trained model is at least partially not available to the first input processing architecture. The process 900 may also include wherein determining the first input processing result comprises determining the first input processing result utilizing the historical data and the trained model.

Additionally, or alternatively, the process 900 may include determining, utilizing the LM, a second input processing result associated with the first voice command. The process 900 may also include determining that the first input processing result from the second input processing architecture conflicts with the second input processing determined utilizing the LM. The process 900 may also include causing, based at least in part on the first input processing result conflicting with the second input processing result, the first input processing architecture to utilize the second input processing result instead of the first input processing result.

Additionally, or alternatively, the process 900 may include determining, utilizing the LM, a second input processing result associated with the first voice command. The process 900 may also include determining a similarity value between the first input processing result and the second input processing result. The process 900 may also include determining that the similarity value satisfies a similarity threshold. The process 900 may also include disabling, based at least in part on the similarity value satisfying the similarity threshold, an interface between the first domain API and the second input processing architecture.

Additionally, or alternatively, the process 900 may include determining, utilizing the LM, second speech processing results associated with the voice commands. The process 900 may also include determining that the input processing results are associated with a confidence value indicating insufficient confidence that the input processing results are accurately associated with the voice commands. The process 900 may also include generating, based at least in part on the confidence value, the first domain API associated with the first action domain.

Figure 10:
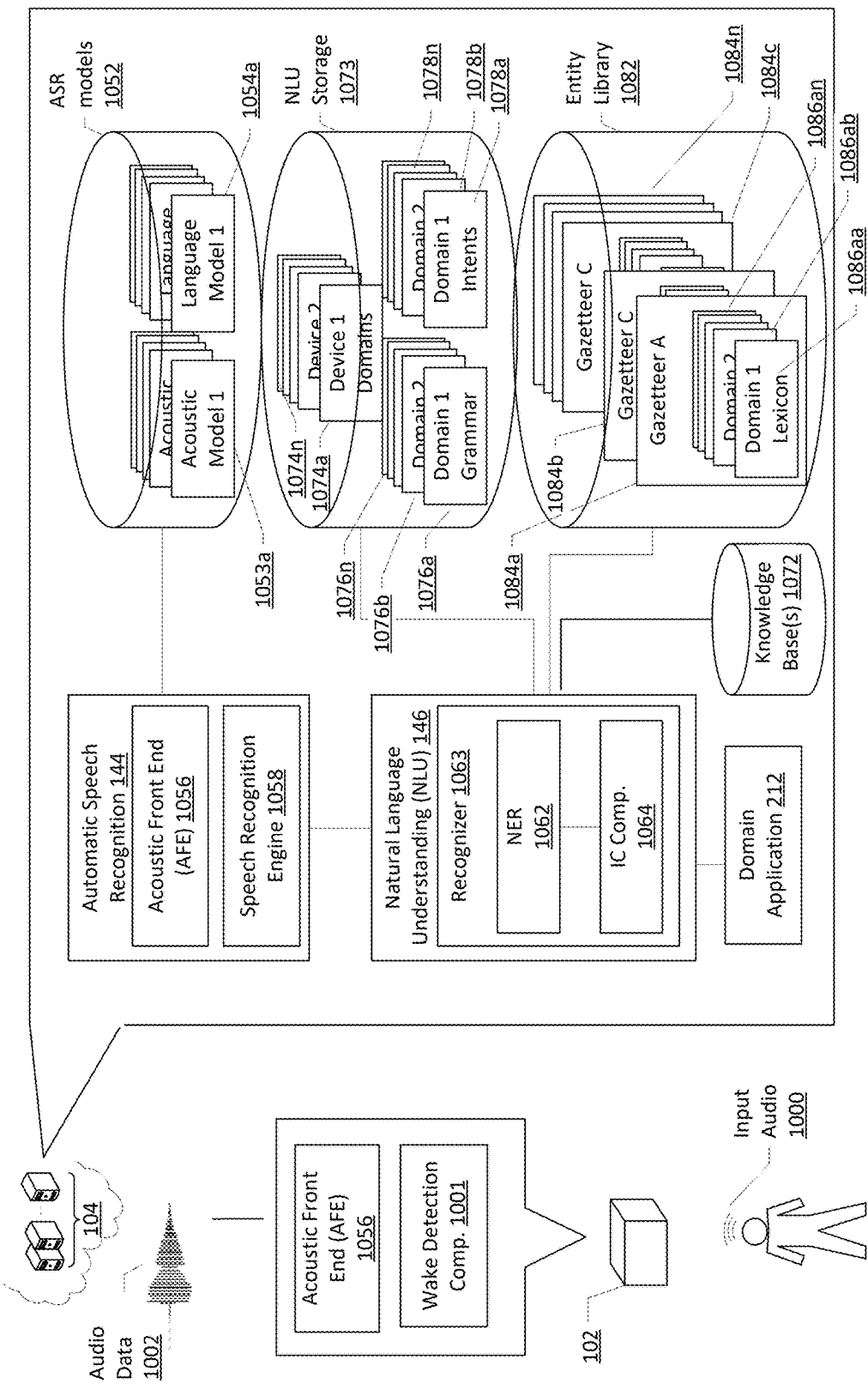
FIG. 10 illustrates a conceptual diagram of components of a speech-processing system for processing audio data provided by one or more devices.

FIG. 10 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin processing audio data). The various components illustrated may be located on a same device or different physical devices. Message between various components illustrated in FIG. 10 may occur directly or across a network 106. An audio capture component, such as a microphone 112 of the device 102, or another device, captures audio 1000 corresponding to a spoken utterance. The device 102, using a wake detection component 1001, then processes audio data corresponding to the audio 1000 to determine if a keyword (such as a wakeword) is detected in the audio data. Following detection of a wakeword, the device 102 processes audio data 1002 corresponding to the utterance utilizing an ASR component 144. The audio data 1002 may be output from an optional acoustic front end (AFE) 1056 located on the device prior to transmission. In other instances, the audio data 1002 may be in a different form for processing by a remote AFE 1056, such as the AFE 1056 located with the ASR component 144.

The wake detection component 1001 works in conjunction with other components of the user device, for example a microphone to detect keywords in audio 1000. For example, the device may convert audio 1000 into audio data 1002, and process the audio data 1002 with the wake detection component 1001 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake detection component 1001 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake detection component 1001 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/RNN structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake." The audio data 1002 may include data corresponding to the wakeword. Further, a local device may "wake" upon detection of speech/spoken audio above a threshold, as described herein. An ASR component 144 may convert the audio data 1002 into text. The ASR transcribes audio data into text data or other ASR output data representing the words of the speech contained in the audio data 1002. The text data or other ASR output data may then be used by other components for various purposes, such as executing system commands, inputting data, etc. A spoken utterance in the audio data is input to a processor configured to perform ASR which then interprets the utterance based on the similarity between the utterance and pre-established language models 1054 stored in an ASR model knowledge base (ASR Models Storage 1052). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1053 stored in an ASR Models Storage 1052), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 144 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1056 and a speech recognition engine 1058. The acoustic front end (AFE) 1056 transforms the audio data from the microphone into data for processing by the speech recognition engine 1058. The speech recognition engine 1058 compares the speech recognition data with acoustic models 1053, language models 1054, and other data models and information for recognizing the speech conveyed in the audio data. The AFE 1056 may reduce noise in the audio data and divide the digitized audio data into frames representing time intervals for which the AFE 1056 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1058 may process the output from the AFE 1056 with reference to information stored in speech/model storage (1052). Alternatively, post front-end processed data (such as feature vectors) may be received by the device executing ASR processing from another source besides the internal AFE. For example, the user device may process audio data into feature vectors (for example using an on-device AFE 1056).

The speech recognition engine 1058 attempts to match received feature vectors to language phonemes and words as known in the stored acoustic models 1053 and language models 1054. The speech recognition engine 1058 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, what time is the pool open until" The wake detection component may identify the wake word, otherwise described as a trigger expression, "Alexa," in the user utterance and may "wake" based on identifying the wake word. The speech recognition engine 1058 may identify, determine, and/or generate text data or other ASR output data corresponding to the user utterance, here "what time is the pool open until."

The speech recognition engine 1058 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 1058 to other processing components, which may be local to the device performing ASR and/or distributed across the network(s). For example, ASR results in the form of a single textual representation of the speech, an N-best list including multiple hypotheses and respective scores, lattice, etc. may be utilized, for natural language understanding (NLU) processing, such as conversion of the text into commands for execution, by the user device and/or by another device (such as a server running a specific application like a search engine, etc.).

The device performing NLU processing 146 may include various components, including potentially dedicated processor(s), memory, storage, etc. As shown in FIG. 10, an NLU component 146 may include a recognizer 1063 that includes a named entity recognition (NER) component 1062 which is used to identify portions of query text that correspond to a named entity that may be recognizable by the system. A downstream process called named entity resolution links a text portion to a specific entity known to the system. To perform named entity resolution, the system may utilize gazetteer information (1084a-1084n) stored in entity library storage 1082. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 144 based on the utterance input audio 1000) and attempts to make a semantic interpretation of the text. That is, the NLU process determines the meaning behind the text based on the individual words and then implements that meaning. NLU processing 146 interprets a text string to derive an intent or a desired action from the user as well as the pertinent pieces of information in the text that allow a device (e.g., device 102) to complete that action. For example, if a spoken utterance is processed using ASR 144 and outputs the text "what time is the pool open until" the NLU process may determine that the user intended to receive a response to the voice command indicating a time when the pool of the enterprise entity closes.

The NLU 146 may process several textual inputs related to the same utterance. For example, if the ASR 144 outputs N text segments (as part of an N-best list), the NLU may process all N outputs to obtain NLU results.

As will be discussed further below, the NLU process may be configured to parse and tag to annotate text as part of NLU processing. For example, for the text "what time is the pool open until," "what time" may be tagged as a command (to determine a time to respond to the user with).

To correctly perform NLU processing of speech input, an NLU process 146 may be configured to determine a "domain" of the utterance so as to determine and narrow down which services offered by the endpoint device may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 1062 receives a query in the form of ASR results and attempts to identify relevant grammars and lexical information that may be used to construe meaning. To do so, the NLU component 146 may begin by identifying potential domains that may relate to the received query. The NLU storage 1073 includes a database of devices (1074a-1074n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," health care," "smart home," "communications," "shopping," "music," "calendaring," etc. As such, each domain may be associated with a particular recognizer 1063, language model and/or grammar database (1076a-1076n), a particular set of intents/actions (1078a-1078n), and a particular personalized lexicon (1086). Each gazetteer (1084a-1084n) may include domain-indexed lexical information associated with a particular user and/or device. For example, the Gazetteer A (1084a) includes domain-index lexical information 1086aa to 1086an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 1064 parses the query to determine an intent or intents for each identified domain, where the intent corresponds to the action to be performed that is responsive to the query. Each domain is associated with a database (1078a-1078n) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 1064 identifies potential intents for each identified domain by comparing words in the query to the words and phrases in the intents database 1078. In some instances, the determination of an intent by the IC component 1064 is performed using a set of rules or templates that are processed against the incoming text to identify a matching intent.

In order to generate a particular interpreted response, the NER 1062 applies the grammar models and lexical information associated with the respective domain to actually recognize a mention of one or more entities in the text of the query. In this manner, the NER 1062 identifies "slots" or values (i.e., particular words in query text) that may be needed for later command processing. Depending on the complexity of the NER 1062, it may also label each slot with a type of varying levels of specificity (such as noun, place, device name, device location, city, artist name, song name, amount of time, timer number, or the like). Each grammar model 1076 includes the names of entities (i.e., nouns) commonly found in speech about the particular domain (i.e., generic terms), whereas the lexical information 1086 from the gazetteer 1084 is personalized to the user(s) and/or the device. For instance, a grammar model associated with the shopping domain may include a database of words commonly used when people discuss shopping.

The intents identified by the IC component 1064 are linked to domain-specific grammar frameworks (included in 1076) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "purchase" is an identified intent, a grammar (1076) framework or frameworks may correspond to sentence structures such as "purchase item called 'Item A' from Marketplace A."

For example, the NER component 1062 may parse the query to identify words as subject, object, verb, preposition, etc., based on grammar rules and/or models, prior to recognizing named entities. The identified verb may be used by the IC component 1064 to identify intent, which is then used by the NER component 1062 to identify frameworks. A framework for the intent of "play a song," meanwhile, may specify a list of slots/fields applicable to play the identified "song" and any object modifier (e.g., specifying a music collection from which the song should be accessed) or the like. The NER component 1062 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 1062 may search the database of generic words associated with the domain (in the knowledge base 1072). So, for instance, if the query was "identify this song," after failing to determine which song is currently being output, the NER component 1062 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to the domain application 212. The domain application 212 may be determined based on the NLU output. For example, if the NLU output includes a command to send a message, the destination domain application 212 may be a message sending application, such as one located on the user device or in a message sending appliance, configured to execute a message sending command. If the NLU output includes a search request, the destination application may include a search engine processor, such as one located on a search server, configured to execute a search command. After the appropriate command is generated based on the intent of the user, the destination domain application 212 may provide some or all of this information to a text-to-speech (TTS) engine. The TTS engine may then generate an actual audio file for outputting the audio data determined by the application (e.g., "okay," or "the pool closes at 10:00 pm").

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 146 during runtime operations where NLU operations are performed on text (such as text output from an ASR component 144). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 1063. Each recognizer may include various NLU components such as an NER component 1062, IC component 1064 and other components such as an entity resolver, or other components.

For example, a messaging domain recognizer 1063-A (Domain A) may have an NER component 1062-A that identifies what slots (i.e., portions of input text) may correspond to particular words relevant to that domain. The words may correspond to entities such as (for the messaging domain) a recipient. An NER component 1062 may use a machine learning model, such as a domain specific conditional random field (CRF) to both identify the portions corresponding to an entity as well as identify what type of entity corresponds to the text portion. The messaging domain recognizer 1063-A may also have its own intent classification (IC) component 1064-A that determines the intent of the text assuming that the text is within the proscribed domain. An IC component may use a model, such as a domain specific maximum entropy classifier to identify the intent of the text, where the intent is the action the user desires the system to perform. For this purpose, device 102 may include a model training component. The model training component may be used to train the classifier(s)/machine learning models discussed above.

As noted above, multiple devices may be employed in a single speech-processing system. In such a multi-device system, each of the devices may include different components for performing different aspects of the input processing. The multiple devices may include overlapping components. The components of the user device and the system 104, as illustrated herein are exemplary, and may be located in a stand-alone device or may be included, in whole or in part, as a component of a larger device or system, may be distributed across a network or multiple devices connected by a network, etc.

Figure 11:
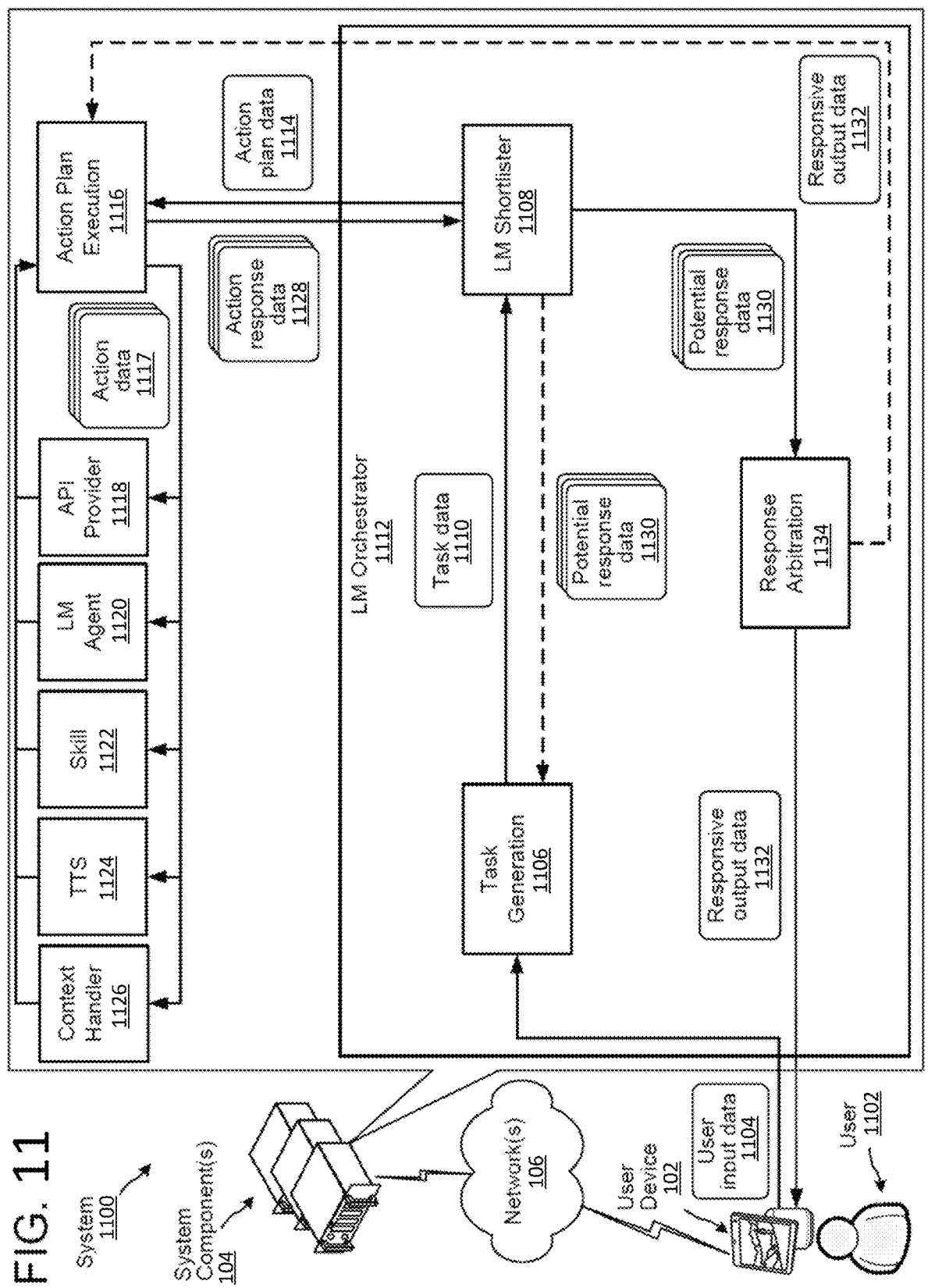
FIG. 11 is a conceptual diagram illustrating example components and processing of a system configured to determine a response to a user input, according to embodiments of the present disclosure.

FIG. 11 illustrates further example components included in the system 1100 configured to determine an action responsive to a user input and in which the context handler component 1126 may be implemented. As shown in FIG. 11, the system may include a user device 102, local to a user 1102, in communication with a system component(s) 104 via a networks(s) 106. The networks(s) 106 may include the Internet and/or any other wide- or local-area network, and may include wired, wireless, and/or cellular network hardware.

The system component(s) 104 may include various components, such as a LM orchestrator component 1112, and an action plan execution component 1116. The LM orchestrator component 1112 may include a task generation component 1106, an LM shortlister component 1108, and a response arbitration component 1134.

In some embodiments, the LM orchestrator component 1112 may generate prompt data representing a prompt for input to one or more language models. As shown in FIG. 11, the system component(s) 104 receive the user input data 1104, which may be provided to the LM orchestrator component 1112. In some instances, the user input data 1104 may correspond to various data types, such as text (e.g., a text or tokenized representation of a user input), audio, image, video, etc. For example, the user input data may include input text (or tokenized) data when the user input is a typed natural language user input. For further example, prior to the LM orchestrator component 1112 receiving the user input data 1104, another component (e.g., an automatic speech recognition (ASR) component 144) of the system 1100 may receive audio data representing the user input. The ASR component 144 may perform ASR processing on the audio data to determine ASR data corresponding to the user input, which may correspond to a transcript of the user input. As described below, with respect to FIG. 13, the ASR component 144 may determine ASR data that includes an ASR N-best list including multiple ASR hypotheses and corresponding confidence scores representing what the user may have said. The ASR hypotheses may include text data, token data, ASR confidence score, etc. as representing the input utterance. The confidence score of each ASR hypothesis may indicate the ASR component's 144 level of confidence that the corresponding hypothesis represents what the user said. The ASR component 144 may also determine token scores corresponding to each token/word of the ASR hypothesis, where the token score indicates the ASR component's 144 level of confidence that the respective token/word was spoken by the user. The token scores may be identified as an entity score when the corresponding token relates to an entity. In some instances, the user input data 1104 may include a top scoring ASR hypothesis of the ASR data. As an even further example, in some embodiments, the user input may correspond to an actuation of a physical button, data representing selection of a button displayed on a graphical user interface (GUI), image data of a gesture user input, combination of different types of user inputs (e.g., gesture and button actuation), etc. In such embodiments, the system 1100 may include one or more components configured to process such user inputs to generate the text or tokenized representation of the user input (e.g., the user input data 1104).

In some embodiments, the LM orchestrator component 1112 may receive input data, which may be processed in a similar manner as the user input data 1104 as described herein. The input data may be received in response to detection of an event such as change in device state (e.g., front door opening, garage door opening, TV turned off, etc.), occurrence of an acoustic event (e.g., baby crying, appliance beeping, etc.), presence of a user (e.g., a user approaching the device 102, a user entering the home, etc.). In some embodiments, the system 1100 may process the input data and generate a response/output. For example, the input data may be received in response to detection of a user generally or a particular user, an expiration of a timer, a time of day, detection of a change in the weather, a device state change, etc. In some embodiments, the input data may include data corresponding to the event, such as sensor data (e.g., image data, audio data, proximity sensor data, short-range wireless signal data, etc.), a description associated with the timer, the time of day, a description of the change in weather, an indication of the device state that changed, etc. The system 1100 may include one or more components configured to process the input data to generate a natural language representation of the input data. The system 1100 may process the input data and may perform an action. For example, in response to detecting a garage door opening, the system 1100 may cause garage lights to turn on, living room lights to turn on, etc. As another example, in response to detecting an oven beeping, the system 1100 may cause a device 102 (e.g., a smartphone, a smart speaker, etc.) to present an alert to the user. The LM orchestrator component 1112 may process the input data to generate tasks that may cause the foregoing example actions to be performed.

In some embodiments, the LM orchestrator component 1112 may generate prompt data representing a prompt for input to the language models. As shown in FIG. 11, the user input data 1104 may be received at the task generation component 1106 of the LM orchestrator component 1112, which may be configured to generate a list (e.g., one or more) of tasks (e.g., steps/actions) that are to be completed in order to perform an action responsive to the user input and select a task of the list of the tasks that is to be completed first (e.g., in a current iteration of processing by the system 1100), as described in detail herein below with respect to FIG. 14. For example, for a user input of "What is the weather for today," the task generation component 1106 may generate a list of tasks of "(1) determine current outside temperature from thermostat; and (2) determine weather forecast for today" and select the task of "determine weather forecast for today" to be completed first. For further example, for a user input of "I am back, please continue outputting the recipe instructions," the task generation component 1106 may generate a list of tasks of "(1) determine context for outputting the recipe instructions; and (2) resume output of the recipe instructions" and select the task of "determine context for outputting the recipe instructions" to be completed first.

In instances where the task generation component 1106 generates more than one task to be completed in order to perform the action responsive to the user input, the task generation component 1106 may further maintain and prioritize the list of tasks as the processing of the system 1100 with respect to the user input is performed. In other words, as the system 1100 processes to complete the list of tasks, the task generation component 1106 may (1) incorporate the potential responses associated with completed tasks into data provided to other components of the system 1100; (2) update the list of tasks to indicate completed (or attempted, in-progress, etc.) tasks; (3) generate an updated prioritization of the tasks remaining to be completed (or tasks to be attempted again); and/or (4) determine an updated current task to be completed. The task generation component 1106 may generate and send task data 1110 representing the selected task to be completed and various other information needed to perform further processing with respect to the task (e.g., the user input data 1104, an indication of the selected task, potential responses associated with previous tasks, the remaining task(s), and context data associated with the user input data 1104, as described in detail herein below with respect to FIG. 14) to the LM shortlister component 1108.

The LM shortlister component 1108 may be configured to determine one or more components (e.g., an API provider component 1118, skill component(s) 1122, LM agent component(s) 1120, a TTS component 1124, the context handler component 1126, etc.) configured to perform an action related to the user input or the current task. The LM shortlister component 1108 may further be configured to generate and cause the execution of a request(s) (e.g., an API call(s), an incomplete API call/API call format, an indication of an action to be performed by a component, etc.) for the one or more components to provide a potential responses(s) to the user input or current task (e.g., a response to a user-provided question, a paragraph from a website, etc.), which may further include a potential action (e.g., a description of a potential action, such as turning on a light, booking a flight ticket, ordering a pizza, etc.) the components are configured to/will perform with respect to the user input or the current task). For example, for a current task of "determine weather forecast for today," the LM shortlister component 1108 may generate requests of "determine user's preferred weather application," "use Weather Application A to determine weather forecast for today," "use Weather Application B to determine weather forecast for today," or the like. Such requests may be represented in the action plan data 1114 sent to the action plan execution component 1116. The action plan execution component 1116 may identify the request(s) in the action plan data 1114, generate executable API calls corresponding to the request(s), and cause the corresponding components (e.g., the API provider component 1118, the LM agent component 1120, the skill component 1122, the TTS component 1124, and/or the context handler component 1126) to generate action response data 1128 representing the requested potential response(s), where individual action response data 1128 may be provided by/correspond to a particular component-one of the API provider component 1118, the LM agent component 1120, the skill component 1122, the TTS component 1124, and/or the context handler component 1126. In some embodiments, the action response data 1128 may include an identifier (e.g., a component name, an alphanumerical value associated with the component, etc.) for the component providing the data. The LM shortlister component 1108 receives and processes the action response data 1128 and generates potential response data 1130 representing the potential response(s) (e.g., relevant potential responses, selected potential responses, ranked potential responses, etc.) for further processing. If the LM shortlister component 1108 determines that there are no remaining tasks to generate potential responses for, the LM shortlister component 1108 may send the potential response data 1130 to the response arbitration component 1134.

The potential response data 1130, in some embodiments, may be determined based on receiving potential responses from various different components that may be relevant in responding to the user input data 1104. For example, the potential response data 1130 may include a first potential response from a first component configured to perform a first task determined by the task generation component 1106, a second potential response from a second component configured to perform a second task determined by the task generation component 1106, etc. The potential response data 1130 can include more than one potential response relating to an individual task. In some embodiments, the potential response data 1130 may be natural language data.

The response arbitration component 1134 processes the potential response data 1130 to determine whether the potential responses generated for the one or more tasks are responsive to the user input. The response arbitration component 1134 processes the potential response data 1130 (representing at least the generated potential responses) and selects one or more of the potential responses that are determined to be responsive to the user input and/or determines that none of the actions are responsive to the user input. For example, the response arbitration component 1134 may process the potential response data 1130 to determine if one or more of the potential responses performable by the API(s) (e.g., the potential responses and/or potential actions) are responsive to the current task. In some embodiments, the response arbitration component 1134 may generate a natural language summary of one or more of the selected responses and output the natural language summary. For example, for a user input of "what is the weather for today" and potential responses of "The weather for today is a high of 75 and a low of 68" and "The weather for today is mostly sunny with a slight chance of rain in the evening," the response arbitration component 1134 may generate a natural language summary of "The weather for today is expected to be mostly sunny with a high of 75 and a low of 68 and a slight chance of rain in the evening," or the like.

Figure 14:
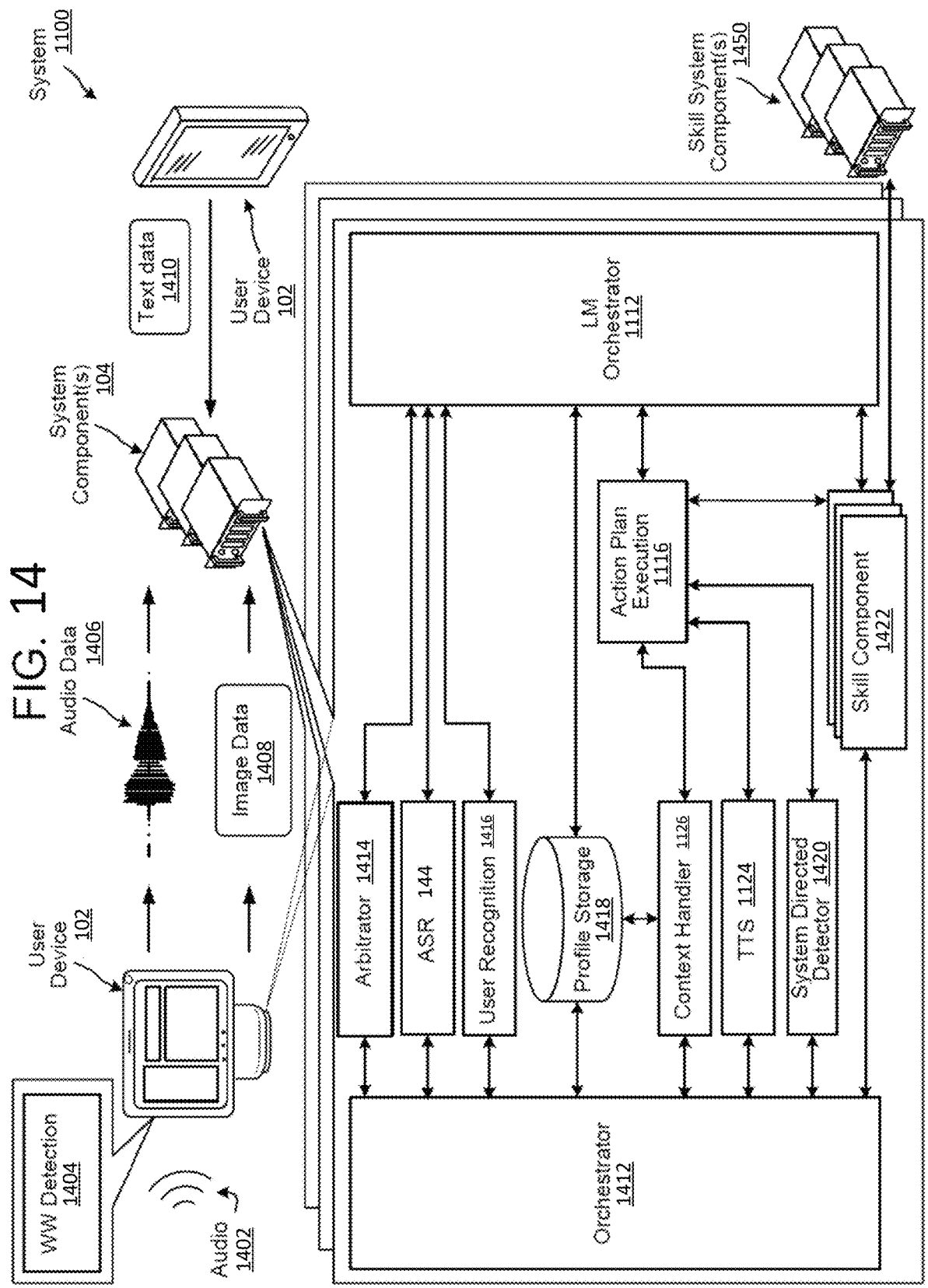
FIG. 14 is a conceptual diagram of components of the system, according to embodiments of the present disclosure.

FIG. 14 illustrates example processing of the task generation component 1106. As shown in FIG. 14, the task generation component 1106 may include a task prompt generation component 1204, a task determination language model 1208, a task selection prompt generation component 1212, and a task selection language model 1216.

As further shown in FIG. 14, the user input data 1104 is received at the task prompt generation component 1204, which is configured to generate a list (e.g., one or more) of tasks (e.g., steps/actions) that are to be completed in order to perform an action responsive to the user input and select a task of the list of the tasks that is to be completed first (e.g., in a current iteration of processing by the system 1100).

The task prompt generation component 1204 processes the user input data 1104 to generate prompt data 1206 representing a prompt for input to the task determination language model 1208. In some embodiments, the task prompt generation component 1204 may further receive an indication of one or more remaining tasks to be completed with respect to the user input data 1104. A task to be completed may correspond to a task for which the system 1100 has yet to generate potential responses for (e.g., for which a responding component, such as the API provider component 1118, the LM agent component 1120, the skill component 1122, the TTS component 1124, and/or the context handler component 1126 have yet to generate action response data for). Similarly, a completed task may correspond to a task for which the system 1100 has generated potential responses for (e.g., for which a responding component, such as the API provider component 1118, the LM agent component 1120, the skill component 1122, the TTS component 1124, and/or the context handler component 1126 have generated action response data). For example, if the current iteration of processing with respect to the user input data 1104 is a subsequent iteration of processing (e.g., the system previously determined that more than one task is to be completed in order to perform an action responsive to the user input data 1104 and has previously generated potential responses for at least a first task of the more than one tasks), then the task prompt generation component 1204 may further receive an indication of the remaining tasks to be completed. In such embodiments, the task prompt generation component 1204 may further receive an indication of the task(s) to complete processing for and/or the potential response(s) of the processing. The task prompt generation component 1204 may further receive the context data 1202 representing various contextual signals associated with/relevant to the user input data 1104, such as user profile information (e.g., user ID, user behavioral information, user preferences, age, gender, devices associated with the user profile, etc.), weather information, time of day, device information associated with the device that sent the user input data 1104 (e.g., device ID, device states, historical device interaction data, etc.). In some embodiments, the context data 1202 may correspond to the context data retrieved by the context handler component 1126. For example, the context data 1202 may be retrieved during a previous iteration of processing by the LM orchestrator component 1112, where the context data 1202 was caused to be retrieved by the LM shortlister component 1108 (e.g., in response to the task generation component 1106 determining that the context data is to be retrieved) and sent to the task generation component 1106 thereafter (e.g., as potential response data). In other embodiments, the context data 1202 may correspond to the context data stored in the memory storage, as discussed herein. Such prompt data 1206 may be generated based on combining the user input data 1104 and the context data 1202 (and, in some embodiments, the indication of the remaining task(s), completed task(s), and/or the potential responses).

In some embodiments, the prompt data 1206 may be an instruction for the task determination language model 1208 to determine one or more tasks (e.g., steps/actions) that are to be completed in order to perform an action responsive to the user input given the other information (e.g., the context data 1202, the indication of the remaining task(s), the indication of the completed task(s), and/or the corresponding potential responses) included in the prompt data 1206.

For example for a user input of "turn on all of the lights except the garage," the task prompt generation component 1204 may generate example prompt data 1206:
{
Create a new task if necessary to help complete a request to turn on all of the lights except the garage.
Here are the completed tasks, their potential responses, user inputs, and context so far:
[ ]
These are the remaining tasks to be completed:
[ ]
Based on the result, create new tasks to be completed, if necessary.
}

In some embodiments, the task prompt generation component 1204 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data 1206 may include "Please generate a polite, respectful, and safe response and one that does not violate protected class policy."

The task determination language model 1208 processes the prompt data 1206 to generate model output data 1210 representing one or more predicted tasks to be completed in order to perform the action responsive to the user input. For example, based on processing the first example prompt data provided above, the task determination language model 1208 may output model output data 1210: {"turn on all of the lights except the garage light,"} or the like. In some embodiments, the threshold for determining the one or more tasks may be such that the task determination language model 1208 is encouraged to generate multiple predicted tasks for a given user input, where the system 1100 may parse and filter the list of tasks during downstream processing (e.g., during the processing of the task selection language model 1216). For example, based on processing the first example prompt data provided above, the task determination language model 1208 may output model output data 1210: {"turn on all of the lights except the garage light," "turn on all lights," "identify which garage light," "turn on all lights then turn off garage light," "turn on all lights where user is located," "turn on kitchen lights, living room lights, dining room lights, hallways lights" "turn on all lights on first floor,"} or the like. As discussed herein above, in some embodiments the LM may correspond to the task determination language model 1208. As such, in such embodiments, the task determination language model 1208 may process, in addition to the processing described herein below, similarly to LM discussed herein above (e.g., the task determination language model 1208 may determine that context data is needed to generate a response to a user input, such as by generating a context-retrieval task).

As an example of a user input that is associated with more than one task, the LM orchestrator component 1112 may receive a user input of "please order some pizza for dinner" and the task prompt generation component 1204 may generate example prompt data 1206:
{
Create a new task if necessary to help complete a request to order some pizza for dinner.
Here are the completed tasks, their potential responses, user inputs, and context so far:
[ ]
These are the remaining tasks to be completed:
[ ]
Based on the result, create new tasks to be completed, if necessary.
}
The task determination language model 1208 processes the prompt data 1206 to generate model output data 1210 representing one or more predicted tasks to be completed in order to perform the action responsive to the user input. For example, based on processing the example prompt data provided above, the task determination language model 1208 may output model output data 1210: {"identify user pizza preference;" (or some other request for context, such as "determine context to order pizza for dinner") "find application that enables ordering of pizza,"} or the like.

As an example of a subsequent round of processing with respect to a user input (e.g., processing performed with respect to a user input that is associated with more than one task), and for the abovementioned user input of "please order some pizza for dinner", the system 1100 may process as described herein below to select and complete the task of "identify user pizza preference" (or some other request for context). The task prompt generation component 1204 may process the user input, corresponding context data, the remaining task list, and the potential responses (e.g., the users pizza preference, determined, for example, using the context data 1202 retrieved using the context handler component 1126) to generate example prompt data 1206:
{
Create a new task if necessary to help complete a request to order some pizza for dinner.
Here are the completed tasks, their potential responses, user inputs, and context so far:
Completed tasks:
Identify user pizza preference: user ordered Brooklyn style pizza from [Pizza Company Name 1]
These are the remaining tasks to be completed: Find application to order pizza
Based on the result, create new tasks to be completed, if necessary.
}
The task determination language model 1208 processes the prompt data 1206 to generate model output data 1210 representing one or more predicted tasks to be completed in order to perform the action responsive to the user input. For example, based on processing the example prompt data provided above, including the context data retrieved using the context handler component 1126 during the previous round of processing, the task determination language model 1208 may further output model output data 1210: {"find an application to order pizza" "find API to order [Pizza Company Name 1] pizza,"} or the like.

In some embodiments, the one or more predicted tasks may include a task of storing context data. For example, the model output data 1210 may include a task of storing relevant context data used during the processing performed with respect to the user input data 1104. For further example, the model output data 1210 may include a task of storing context data that was used during the processing performed with respect to previous user input data.

The model output data 1210 is sent to the task selection prompt generation component 1212, which processes the model output data 1210 to generate prompt data 1214 representing a prompt for input to the task selection language model 1216. In some embodiments, such prompt data 1214 may be generated based on combining the user input data 1104, the context data 1202, the prompt data 1206, and/or the model output data 1210. In some embodiments, the task generation component 1106 may include another component that parses the model output data 1210 to determine the one or more tasks and may send a representation of the one or more tasks to the task selection prompt generation component 1212.

In some embodiments, the prompt data 1214 may be an instruction for the task selection language model 1216 to select a task of the one or more tasks that is to be completed first (e.g., completed during the current iteration of processing) given the information (e.g., user input data 1104, the context data 1202, and the one or more tasks) included in the prompt data 1214. In some embodiments, the prompt data 1214 may further include an instruction for the task selection language model 1216 to determine a priority of the one or more tasks (e.g., an ordered list representing the order in which the one or more tasks are to be completed).

For example, for the example user input provided above of "please order some pizza for dinner," the task selection prompt generation component 1212 may generate example prompt data 1214:

{
Select the top prioritized task given the ultimate goal of order some pizza for dinner
Here are the completed tasks, their potential responses, user inputs, and context so far:
[ ]
Here are the task candidates:
Identify user pizza preference (or some other context retrieval task)
Find an application that sells pizza
Return your selected task, return None if the goal is achieved or indicate existing ambiguities.
}

For further example, for the second round of processing performed with respect to the example user input of "please order some pizza for dinner," the task selection prompt generation component 1212 may generate example prompt data 1214:

{
Select the top prioritized task given the ultimate goal of please order some pizza for dinner
Here are the completed tasks, their potential responses, user inputs and context so far:
Completed tasks:
    Identify user pizza preference: user ordered Brooklyn style pizza from [Pizza Company 1 Name]
Here are the task candidates:
find an application that sells pizza
find API that sells [Pizza Company 1 Name] pizza
Return your selected task, return None if the goal is achieved or indicate existing ambiguities.
}

In some embodiments, the task selection prompt generation component 1212 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data may include "Please generate a polite, respectful, and safe response and one that does not violate protected class policy."

The task selection language model 1216 processes the prompt data 1214 to generate model output data representing the task to be completed first and/or a prioritization of the one or more tasks. For example, based on processing the first example prompt data 1214 provided above, the task selection language model 1216 may output model output data: {"1. Identify user pizza preference,"} or the like. For further example, based on processing the second example prompt data 1214 provided above, the task selection language model 1216 may output model output data: {"1. Find an API that sells [Pizza Company Name 1] pizza,"} or the like. In some embodiments, during processing of the task selection language model 1216 to select and/or prioritize the one or more tasks, the task selection language model 1216 may update the task list to remove any redundant and/or conflicting tasks. For example, for the example prompt data 1214, the task selection language model 1216 may determine that the remaining tasks of "find an application that sells pizza" and "find an API that sells [Pizza Company Name 1] pizza" are redundant, and that "find an API that sells [Pizza Company Name 1] pizza has a higher priority. Therefore, the task selection language model 1216 may remove the task of "find an application that sells pizza" from the remaining task list. Thereafter, the task generation component 1106 (or another component of the task generation component 1106) may process the model output data of the task selection language model 1216 to determine task data 1110 representing the user input data 1104 and/or the task selected by the task selection language model 1216 to be completed first. In some embodiments, the task data 1110 may include the remaining one or more tasks and/or may indicate the prioritization of the one or more tasks, as determined by the task selection language model 1216. The task data 1110 may be sent to the LM shortlister component 1108, which is described in detail herein below with respect to FIG. 13.

Figure 13:
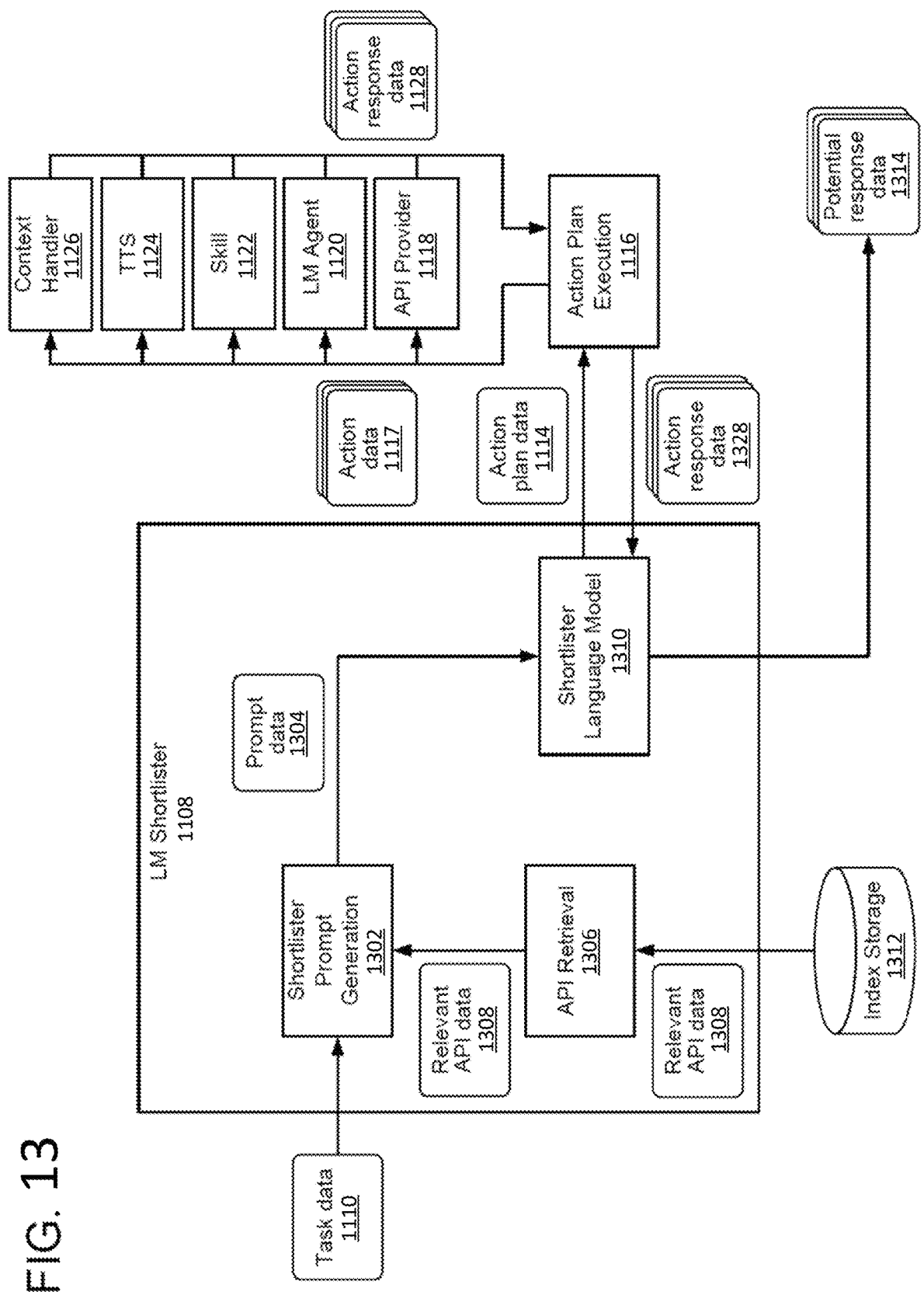
FIG. 13 is a conceptual diagram illustrating example components and processing of a language model (LM) shortlister component, according to embodiments of the present disclosure.

FIG. 13 illustrates example processing of the LM shortlister component 1108. As shown in FIG. 13, the LM shortlister component 1108 may include an index storage 1312, an API retrieval component 1306, a shortlister prompt generation component 1302, and a shortlister language model 1310.

The LM shortlister component 1108 is configured to determine one or more components (e.g., APIs (via the API provider component 1118, skill component(s) 1122, LM agent component(s) 1120, TTS component 1124, context handler component 1126, etc.) configured to perform an action related to the user input or the current task. The LM shortlister component 1108 is further configured to generate and cause the execution of a request(s) (e.g., an API call(s), an incomplete API call/API call format, an indication of an action to be performed by a component, etc.) for the one or more components to provide a potential responses(s) to the user input or current task (e.g., a response to a user-provided question, a paragraph from a website, etc.), which may further include a potential action (e.g., a description of a potential action, such as turning on a light, booking a flight ticket, ordering a pizza, etc.) the components are configured to/will perform with respect to the user input or the current task).

As further shown in FIG. 13, the task data 1110 is received at the shortlister prompt generation component 1302. The shortlister prompt generation component 1302 processes the task data 1110 to generate prompt data 1304 representing a prompt for input to the shortlister language model 1310. In some embodiments, such prompt data 1304 may be generated based on combining the task data 1110 (e.g., the user input data 1104, the context data 1202, the selected task, remaining tasks, potential responses associated with one or more previous tasks, etc.) and relevant API data 1308 representing one or more APIs associated with the user input data 1104 and/or the current task.

The relevant API data 1308 may be generated by the API retrieval component 1306, which may be configured to retrieve one or more (e.g., top-k) relevant APIs associated with the user input data 1104 or the current task. In some embodiments, the APIs may correspond to various components. For example, the components may correspond to rule-based components, ML-based components, LM-based components, or the like, such as the orchestrator component 1112, the API provider component 1118, the LM agent component 1120, the skill component 1122, the TTS component 1124, the context handler component 1126, etc.) In some embodiments, the APIs may correspond to the components.

The API retrieval component 1306 may use retrieval-based approaches to retrieve the one or more relevant APIs from the index storage 1312, which may store various information associated with multiple APIs (and/or components) such as component descriptions, API arguments (e.g., parameter inputs/outputs), identifiers for components (e.g., such as the API provider component 1118, the LM agent component 1120, the skill component 1122, the TTS component 1124, the context handler component 1126, etc.) that provides the API, etc. For example, the API retrieval component 1306 may compare one or more APIs (and/or components) included in the index storage 1312 to the user input or the current task to determine one or more APIs (or components) (top-k) that corresponds to the user input or the current task (e.g., APIs (and/or components) that are semantically similar to the user input or the current task, APIs (and/or components) that are capable of performing the current task, etc.). In some embodiments, the API retrieval component 1306 (or another component of the API retrieval component 1306) may determine an encoded representation of the user input or the current task and compare (e.g., using cosine similarity) the encoded representation(s) to an encoded representation of a component description for the API (and/or component) to determine whether the API (and/or component) is semantically similar to the user input or the current task. A component description may correspond to a description of the one or more function that the API (and/or component) is configured to perform and/or other information associated with the API (and/or component) (e.g., an API call formatting structure (e.g., including input parameters), historical accuracy/defect rate, historical latency value, etc.). In some embodiments, the component description may further include one or more exemplars associated with use of the API (and/or component) (e.g., an example user input, corresponding API call, and example API output). If the value of semantic similarity meets or exceeds a threshold, the API (and/or component) (and, optionally, the component description) may be included in the relevant API data 1308. In some embodiments, the API retrieval component 1306 may determine the relevant API data 1308 further using contextual information, including the context data 1202, an accuracy/defect rate value associated with the APIs (and/or components), and/or a historical latency value associated with the APIs (and/or components) (e.g., which may be included in the description of the API). In some embodiments, the index storage 1312 may be included in the API retrieval component 1306. Similar processing may be performed to determine one or more components that are semantically similar to the user input or the current task, which may be included in the relevant API data 1308. The API retrieval may send the relevant API data 1308 to the shortlister prompt generation component 1302.

In some embodiments, the prompt data 1304 may be an instruction for the shortlister language model 1310 to determine one or more APIs (and/or components) that are to process with respect to the user input or the current task (e.g., determine one or more API calls to cause the APIs (and/or components) to process) given the information (e.g., the user input data 1104, the context data 1202, the current task, and the relevant API data 1308). As discussed herein above, in some embodiments the task prompt generation component 1204 may corresponding to the shortlister prompt generation component 1302. As such, in some embodiments, the shortlister prompt generation component 1302 may, in addition to the processing discussed herein below, process similar to the task prompt generation component 1204 (e.g., to generate prompt data for input to an LM configured to generate a request for context data).

For example, for the selected task of "turn on all of the lights except the garage light" and corresponding relevant API data, the shortlister prompt generation component 1302 may generate example prompt data 1304:
{
Find an execute an API to complete the task of turn on all of the lights except the garage light
Here is a list of relevant API available:
Let's chat API
Classic NLU API
Smart Home skill
If no appropriate API is found, summarize as nothing is found.
}
For further example, for the selected task of "Identify user pizza preference" (or some other related context retrieval task) and corresponding relevant API data, the shortlister prompt generation component 1302 may generate example prompt data 1304:
{
Find an execute an API to complete the task of identifying the user's pizza preference
Here is a list of relevant API available:
Context Handler API
If no appropriate API is found, summarize as nothing is found.
}
As another example, for the subsequently selected task of "find application to order pizza" and corresponding relevant API data, the shortlister prompt generation component 1302 may generate example prompt data 1304:
{
Find and execute an API to complete the task of find application to order pizza
Here is a list of relevant API available:
Let's chat API
[Food Ordering Application 1] API
[Food Ordering Application 2] API
If no appropriate API is found, summarize as nothing is found.
}
In some embodiments, the shortlister prompt generation component 1302 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data may include "Please generate a polite, respectful, and safe response and one that does not violate protected class policy."

The shortlister language model 1310 processes the prompt data 1304 to generate one or more API calls corresponding to request(s) that the corresponding APIs (and/or components) return a potential response to the user input/current task and/or a potential action(s) that the APIs (and/or components) are configured to/will perform with respect to the user input and/or the current task (e.g., a natural language description of the potential action(s)). In some embodiments, the shortlister language model 1310 may generate API calls for a subset of the APIs represented in the prompt data 1304. For example, based on processing the first example prompt data provided above, the shortlister language model 1310 may output model output data: {"Use Let's chat API to turn on all of the lights except the garage light, Use Smart Home skill to turn on all of the lights except the garage light"}, {"Letschat ("turn on all of the lights except the garage light"), or the like. For further example, based on processing the second example prompt data provided above, the shortlister language model 1310 may output model output data: {"retrieve context to identify user's pizza preference,"} or the like. As another example, based on processing the third example prompt data provided above, the shortlister language model 1310 may output model output data: {"Use [Food Ordering Application 1] to order pizza, Use [Food Ordering Application 2] to order pizza,"} or the like.

As discussed herein above, in some embodiments, the LM may correspond to the shortlister language model 1310. In such embodiments, the shortlister language model 1310 may, in addition to the processing discussed herein with respect to FIG. 11, process similar to the LM. For example, the shortlister language model 1310 may be configured to generate a request for the context handler component 1126 to retrieve context data relevant to the user input data 1104 and/or one or more of the tasks. For further example, the shortlister language model 1310 may be configured to generate a request for the context handler component 1126 to store context data, such as in response to a corresponding task and/or in response to a request from the response arbitration component 1134.

The shortlister language model 1310 may generate the one or more APIs calls (including the required input parameters) by applying in-context learning for cold-starting API calls (e.g., one-shot/few-shot learning). For example, in embodiments where the relevant API data 1308 includes the component descriptions, the shortlister language model 1310 may use the one or more exemplars included in the component descriptions (included in the prompt data 1304) to determine the one or more input parameters for the API call. In some embodiments, the shortlister language model 1310 may be finetuned on such exemplars (e.g., during offline or runtime processing), such that the shortlister language model 1310 is capable of determining the one or more input parameters for the given API call.

During processing of the shortlister language model 1310 and after generating the one or more requests, the shortlister language model 1310 may cause the one or more requests to be executed. For example, as shown in FIG. 13, the shortlister language model 1310 may send action plan data 1114 representing the one or more requests to the action plan execution component 1116, which causes execution of the one or more requests included in the action plan data 1114. For example, the action plan execution component 1116 may process the action plan data 1114 to generate action data 1117. Action data 1117 may represent, for example, an instruction (e.g., an executable API call determined from/ generated based on the action plan data 1114) for a particular API to process with respect to the user input and/or the current task. In embodiments where the action plan data 1114 includes requests corresponding to incomplete API calls, API call formats, indications of actions to be performed by one or more components, the action plan execution component 1116 may be configured to generate executable API calls corresponding to the action plan data 1114. In some embodiments, the action plan execution component 1116 may generate the action data 1117 to represent an instruction to provide the responses including the potential response(s)/potential action(s) with respect to the user input and/or the current task.

In some embodiments, the shortlister language model 1310 may send model output data including the one or more requests to another component of the LM orchestrator component 1112, which may be configured to parse the model output data to identify the one or more requests.

Thereafter, the component may generate the action plan data 1114 representing the one or more requests and send the action plan data 1114 to the action plan execution component 1116.

The action plan execution component 1116 may send the action data 1117 to the API provider component 1118, the LM agent component 1120, the skill component 1122, the TTS component 1124, and/or the context handler component 1126. The API provider component may include one or more components (e.g., rule-based components, ML-based components, LM-based components, or the like) that may be caused to process using the action data 1117 (e.g., using the API calls generated by the LM shortlister component 1108).

The TTS component 1124 may be configured to process textual or tokenized input to generate audio data representing synthesized speech corresponding to the textual or tokenized input spoken by a synthetic voice.

The skill component 1122 may be software running on the system component(s) 104 that is akin to a software application. That is, a skill component 1122 may enable the system component(s) 104 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 104 may be configured with more than one skill component 1122. For example, a weather service skill component may enable the system component(s) 104 to provide weather information, a car service skill component may enable the system component(s) 104 to book a trip with respect to a taxi or ride sharing service, a restaurant skill component may enable the system component(s) 104 to order a pizza with respect to the restaurant's online ordering system, etc. A skill component 1122 may operate in conjunction between the system component(s) 104 and other devices, such as the user device 102, in order to complete certain functions. A skill component 1122 may include hardware, software, firmware, or the like that may be dedicated to a particular skill component 1122 or shared among different skill components 1122.

The LM agent component 1120 may correspond to one or more LM agents. An LM agent component 1120 may correspond to a custom instantiation of an LM (and other components) that is configured to handle user inputs relating to a particular domain/functionality. In some embodiments, the LM agent component 1120 may be configured to handle specific use cases via particular prompt generation, finetuning of the LM, etc. For example, the LM agent component 1120 may be configured to handle user inputs/tasks related to information query, the LM agent component 1120 may be configured handle user inputs/tasks related to shopping, the LM agent component 1120 may be configured to handle user inputs/tasks related to ordering food from various restaurants, the LM agent component 1120 may be configured to handle user inputs/tasks related to ordering food from a particular restaurant (e.g., a particular pizza restaurant), the LM agent component 1120 may be configured to handle user inputs/tasks related to booking a hotel, the LM agent component 1120 may be configured to handle user inputs/tasks related to booking a flight, etc.

The API provider component 1118 may include various components that may be caused to execute using the action data 1117. For example, the API provider component 1118 may include an entity recognition (ER) component, which may be configured to process textual or tokenized input to link one or more entity references included in the textual or tokenized input to a specific corresponding entity known to the system 1100. For example, based on the textual or tokenized input (e.g., a context of the textual or tokenized input), the ER component may determine that a reference to "Neil Armstrong" is directed to the American astronaut. In some embodiments, the action data 1117 may include an indication(s) (e.g., slots) of one or more entities included in the user input, as determined by one or more of the language models described with respect to FIG. 10, in which case the ER component may process to link the one or more entities to the specific, referenced, entity known to the system 1100.

In other embodiments, the ER component may be configured to process the action data 1117 to determine the one or more entities included in the user input and link the one or more determined entities to the specific, referenced, entity (entities) known to the system 1100. For example, the ER component may include one or more recognizers. Each recognizer may include a named entity recognition (NER) component. The NER component applies grammar information and lexical information (received from a storage) associated with a domain (associated with the recognizer implementing the NER component) to determine a mention of one or more entities in text data. In this manner, the NER component identifies "slots" (each corresponding to one or more particular words in text data) that may be useful for later processing. The NER component may also label each slot with a type (e.g., noun, place, city, artist name, song name, etc.). Thereafter, the ER component links a slot of text data to a specific entity known to the system. To perform entity resolution, the ER component may utilize gazetteer information stored in an entity library storage. The gazetteer information may be used to match text data (representing a portion of the user input) with text data representing known entities, such as song titles, contact names, etc. Gazetteers may be linked to users (e.g., a particular gazetteer may be associated with a specific user's music collection), may be linked to certain domains (e.g., a shopping domain, a music domain, a video domain, etc.), or may be organized in a variety of other ways.

For further example, the API provider component 1118 may include a search component, which may be configured to query a storage (e.g., a database, repository, knowledge base, etc.) for information usable for generating a response to a user input. For example, if the action data 1117 represents a request for information of "Who won the game between [Team 1 Name] and [Team 2 Name]," then the search component may query the storage (or other sources, such as the Internet), to retrieve the information "[Team 1 Name] won the game between [Team 1 Name] and [Team 2 Name]."

As an even further example, the API provider component 1118 may include the device controller component discussed herein above, which may be further configured to cause a device to perform an action corresponding to the action data 1117.

In some embodiments, the API provider component 1118 may include a domain service component, which may be configured for interacting with one or more services defined by particular users, such as developers, specialists, or the like (e.g., to receive information, such as responses or annotations, to cause an action.

One or more of abovementioned components may send action response data 1128 representing one or more potential responses generated by the one or more APIs corresponding to the action data 1117 (e.g., the potential response(s) and/or potential action(s)) to the action plan execution component 1116. For example, in response to an API call to the skill component 1122 associated with a user input for turning on a light, the action response data 1128 may correspond to a potential action of "turn on the light," or the like. For further example, in response to an API call to the context handler component 1126 associated with retrieving context for a user input for ordering pizza, the action response data 1128 may correspond to context data representing the user has previously indicated that they prefer Brooklyn style pizza. For further example, in response to an API call to the skill component 1122 associated with a user input for ordering a pizza from a particular restaurant, the action response data 1128 may correspond to a potential action of "order medium pizza from [restaurant name]", or the like. The action plan execution component 1116 may send the action response data 1128 to the shortlister language model 1310.

In some embodiments, the action plan execution component 1116 may send the action response data 1128 to the shortlister prompt generation component 1302, which may generate further prompt data including the action response data 1128 and be sent to the shortlister language model 1310. For example, the further prompt data may be generated based on combining the prompt data 1304 and the action response data 1128.

In some embodiments, the shortlister language model 1310 may process the action response data 1128 (or the further prompt data including action response data 1128) to generate a natural language summary of the action response data (e.g., the potential response data 1130). In some embodiments, the potential response data 1130 may include an association between action response data 1128 (or a summarized representation of the action response data 1128) and an indication of the API/component that generated the action response data 1128 (e.g., a component identifier, component description, etc.). In some embodiments, the shortlister language model 1310 may be configured to filter and/or rank the action response data 1128 based on how relevant the action response data 1128 is to the current task. In some embodiments, the shortlister language model 1310 may be configured to filter and/or rank the action response data 1128 based on a confidence level of the component that provided the action response data, where the confidence level may indicate a likelihood of the component being able to respond (e.g., within a period of time), the component being able to perform a potential action that corresponds to the current task, etc. In some embodiments, the action response data 1128 may indicate whether or not the corresponding component is able to respond (e.g., the action response data 1128 may include a Boolean value such as "yes" or "no" or other similar indications). In some embodiments, the shortlister language model 1310 may filter and/or rank the action response data 1128 based on information included in the prompt data 1304 (e.g., the user input data 1104, the relevant API data 1308, the context data 1202, the prompt data 1206, etc.). For example, the potential response data 1130 may include a subset of the action response data 1128 (or the summarized representations of the action response data 1128) and may further include a representation of a confidence associated with the action response data 1128 (or a summarized representation of the action response data 1128). As such, the potential response data 1130 may further include data representing a confidence of how relevant the action response data 1128 is to the current task. In some embodiments, the shortlister language model 1310 may consider a rating associated with the component that provided the action response data 1128, where the rating may be a user satisfaction rating provided by multiple different users of the system 1100, a user satisfaction rating provided by the user 1102 associated with the user input data 1104, a system generated rating based on the number of past tasks handled by the component, an accuracy rating based on the number of past tasks the component had handled correctly/provided a desired response for, etc.

The LM shortlister component 1108 may send the potential response data 1130 for further processing. In instances where the task generation component 1106 determined that more than one task is to be completed, the LM shortlister component 1108 may send the potential response data 1130 to the task generation component 1106, which may process as described herein above to maintain and prioritize the task list based on the potential response data 1130 and select a new task to be completed. For example, in the instance where the selected task was "identify user's pizza preference," or some other context retrieval task, the shortlister language model 1310 may send potential response data 1314 corresponding to the context data retrieved by the context handler component 1126 to the task generation component 1106, to process.

In instances where the task generation component 1106 determined that only one task is to be completed, or in instances where the LM shortlister component 1108 determines that there are no remaining tasks to be completed, the LM shortlister may send the potential response data 1130, and the potential responses associated with previously completed tasks (e.g., previous action response data) to the response arbitration component 1134 to process as discussed herein above. The LM shortlister component 1108 may further send the user input data 1104, the context data 1202, etc., to the task generation component 1106 and/or the response arbitration component 1134.

As discussed herein above, in some embodiments, the LM orchestrator component 1112 may further include a memory storage which may store various information associated with the processing performed. In addition, or alternative, the memory storage may store any of the additional information discussed herein above that was determined/generated during one or more previous iterations of processing by the LM orchestrator component 1112 for the user input data 1104 (e.g., the user input data 1104, the prompt data 1206, the context data 1202, the model output data 1210, prompt data 1214, the task data 1110, the relevant API data 1308, the prompt data 1304, the action plan data 1114, the action response data 1128, the potential response data 1130, etc.). As such, after the LM shortlister component 1108 generates the potential response data 1130, the LM orchestrator component 1112 may send the abovementioned data to the memory storage. In some embodiments, the above-mentioned data may be sent to the memory storage as it is generated by the system 1100.

In such embodiments, one or more of the prompt generation components discussed herein may be configured to include (e.g., append) one or more portions of the data included in the memory storage in the data (e.g., the generated prompts) to the corresponding language models. For example, during a subsequent iteration of processing, the task prompt generation component 1204 may receive one or more portions of the data included in the memory storage (which were generated during one or more previous iterations of processing performed with respect to the user input data 1104) and include the one or more portions of data in the prompt data 1206.

In some embodiments, the response arbitration component 1134 may be configured to further process data representing a potential response to the user input that is generated by one or more other components of the system 1100 not included in the LM orchestrator component 1112. For example, the response arbitration component 1134 may further receive data from an orchestrator component 1412 (discussed in detail herein below with respect to FIG. 14) representing a potential response to the user input (e.g., the output of the skill component 1122), where the orchestration of the processing performed to generate the potential response was performed by the orchestrator component 1412, rather than the LM orchestrator component 1112. In such embodiments, the response arbitration component 1134 may be further configured to arbitrate between first potential responses received as a result of the processing of the LM orchestrator component 1112 and second potential responses received as a result of the processing of the orchestrator component 1512. As discussed above, the response arbitration component 1134 may select one or more portions (e.g., potential actions, potential responses, etc.) of the first potential responses and/or the second potential responses that are determined to be responsive to the user input and cause output of the one or more portions (or a summarized representation of the one or more portions) and/or performance of the potential actions corresponding to the selected responses.

In some embodiments, the data received from the orchestrator component 1412 may be included in the potential response data 1130. For example, the orchestrator component 1412 may be determined to be configured to perform a function (e.g., cause another component(s) to perform a function) potentially relevant to the user input such that the LM shortlister component 1108 may cause the orchestrator component 1412 to generate potential responses potentially responsive to the user input, which may be included in the potential response data 1130 sent to the response arbitration component 1134.

Figure 12:
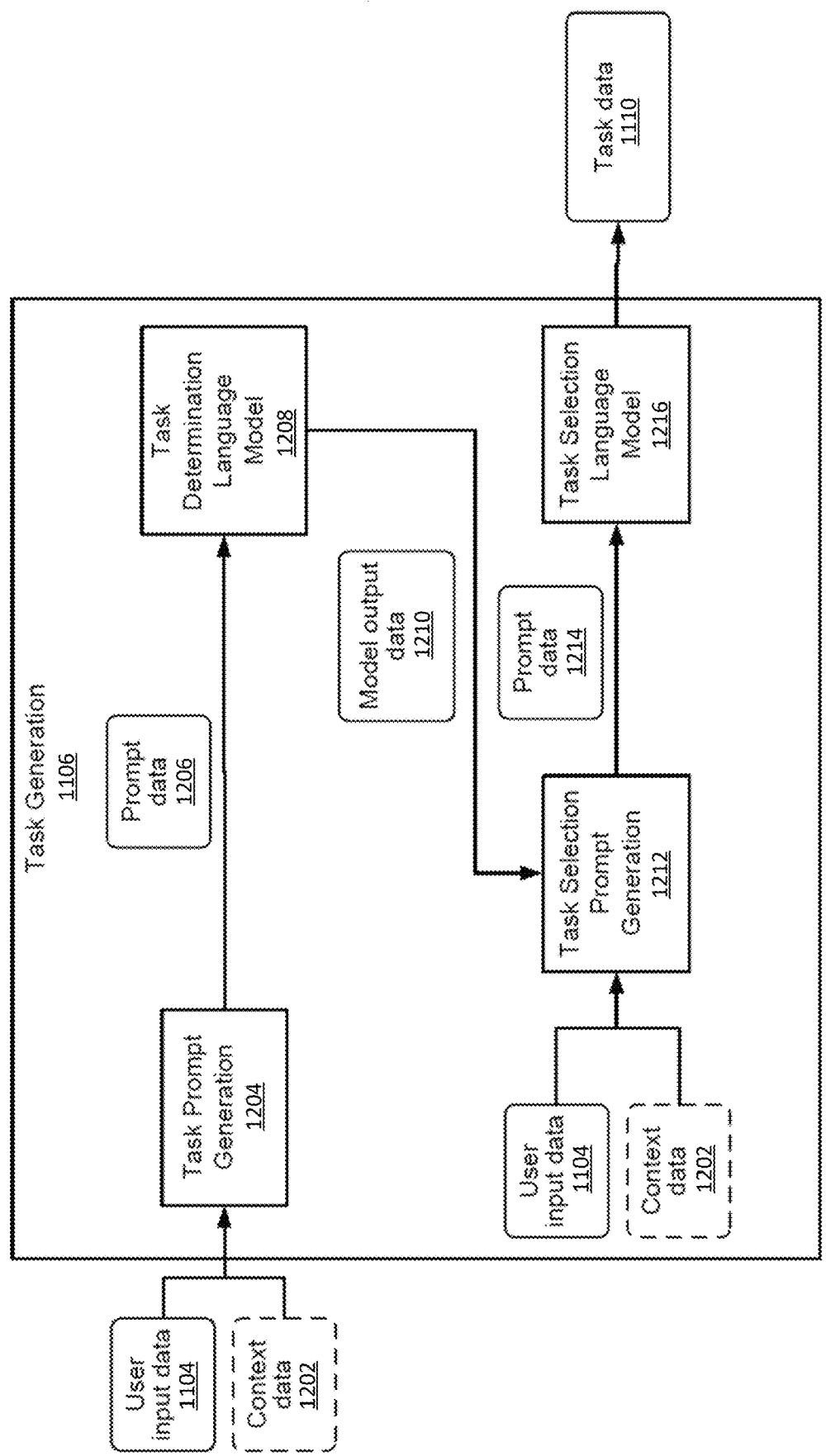
FIG. 12 is a conceptual diagram illustrating example components and processing of a task generation component, according to embodiments of the present disclosure.

In some embodiments, the language models of FIGS. 12, and/or 13 may be fine-tuned to perform a particular task(s). Fine-tuning of the language models may be performed using one or more techniques. One example fine-tuning technique is transfer learning that involves reusing a pre-trained model's weights and architecture for a new task. The pre-trained model may be trained on a large, general dataset, and the transfer learning approach allows for efficient and effective adaptation to specific tasks. Another example fine-tuning technique is sequential fine-tuning where a pre-trained model is fine-tuned on multiple related tasks sequentially. This allows the model to learn more nuanced and complex language patterns across different tasks, leading to better generalization and performance. Yet another fine-tuning technique is task-specific fine-tuning where the pre-trained model is fine-tuned on a specific task using a task-specific dataset. Yet another fine-tuning technique is multi-task learning where the pre-trained model is fine-tuned on multiple tasks simultaneously. This approach enables the model to learn and leverage the shared representations across different tasks, leading to better generalization and performance. Yet another fine-tuning technique is adapter training that involves training lightweight modules that are plugged into the pre-trained model, allowing for fine-tuning on a specific task without affecting the original model's performance on other tasks.

In some embodiments, as discussed above, one or more components of the system 1100 discussed herein above may be configured to begin processing with respect to data as soon as the data or a portion of the data is available to the one or more components. Some components of the system 1100 are generative components/models that can begin processing with respect to portions of data as they are available, instead of waiting to initiate processing after the entirety of data is available. In other words, the system 1100 may be configured to stream portions of data associated with processing with respect to a user input to the one or more components such that the one or more components may begin performing their configured processing with respect to that data as soon as it is available to the one or more components. For example, if the output of the task determination language model 1208, the task selection language model 1216, and/or the shortlister language model 1310 indicates that additional information is needed to complete a first task associated with a user input, a request for the additional information may be sent to the context handler component 1126. Thereafter, the task determination language model 1208, the task selection language model 1216, and/or the shortlister language model 1310 may continue to process to complete their configured operations. For example, while the context handler component 1126 is processing to determine the context data, the system 1100 may begin processing with respect to a second task associated with the user input. Thereafter, the output of the context handler component 1126 may be sent to the response arbitration component 1134 such that once the response arbitration component 1134 receives the output of the LM shortlister component 1108, the response arbitration component 1134 may resolve the ambiguity that resulted in the request for the context data in order to generate the responsive output data 1132. For further example, if the user input data 1104 is generated to include the natural language representation of the user input, but the processing required to determine the corresponding contextual signals (e.g., weather data, time of data, dialog history, device information, etc.) is yet to be completed, the task generation component 1106 may begin processing with respect to the natural language representation of the user input. Once the corresponding contextual signals have been generated, the task generation component 1106 may begin processing with respect to the contextual signals and may update downstream components with the result of the processing with respect to the contextual signals.

As another example, if the task generation component 1106 determines that more than one task is to be completed to perform an action responsive to a user input, and the LM shortlister component 1108 processes as described herein above to cause one or more components to generate potential responses with respect to a first task of the more than one tasks, the LM shortlister component 1108 may send the potential responses (and a representation of the user input and the current task) to the response arbitration component 1134 to process as described herein above with respect to those potential responses while the system 1100 (e.g., the task generation component 1106 and/or the LM shortlister component 1108) completes processing with respect to the remaining tasks of the one or more tasks. Therefore, the response arbitration component 1134 may process as described herein to select between the potential responses associated with the first task while the potential responses associated with one or more of the remaining tasks is completed. As such, the response arbitration component 1134 may only need to arbitrate between the potential responses associated with the first task that were previously selected by the response arbitration component 1134 as being responsive to the first task when the response arbitration component 1134 later processes with respect to further potential responses associated with further tasks.

As a further example, if the API retrieval component 1306 determines (e.g., with a confidence value that meets or exceeds a particular threshold) that a particular API or component description should be included in the relevant API data, the API retrieval component 1306 may provide the corresponding relevant API data to the shortlister prompt generation component 1302 so that the shortlister prompt generation component 1302 may begin processing with respect to the relevant API data while the API retrieval component 1306 continues to determine one or more further relevant API data. In general, the system 1100 is capable of performing such streaming and processing of portions of data discussed herein (e.g., for processing with respect to a user input) and updating downstream components with the results of processing of newly available portions of data as the data becomes available for processing.

The system 1100 may operate using various components as described in FIG. 14. The various components may be located on same or different physical devices. Communication between various components may occur directly or across a networks(s) 106. The user device 102 may include audio capture component(s), such as a microphone or array of microphones of a user device 102, captures audio 1402 and creates corresponding audio data. Once speech is detected in audio data representing the audio 1402, the user device 102 may determine if the speech is directed at the user device 102/system component(s). In at least some embodiments, such determination may be made using a wakeword detection component 1404. The wakeword detection component 1404 may be configured to detect various wakewords. In at least some examples, each wakeword may correspond to a name of a different digital assistant. An example wakeword/digital assistant name is "Alexa." In another example, input to the system may be in form of text data 1410, for example as a result of a user typing an input into a user interface of user device 102. Other input forms may include indication that the user has pressed a physical or virtual button on user device 102, the user has made a gesture, etc. The user device 102 may also capture images using camera(s) of the user device 102 and may send image data 1408 representing those image(s) to the system component(s). The image data 1408 may include raw image data or image data processed by the user device 102 before sending to the system component(s). The image data 1408 may be used in various manners by different components of the system to perform operations such as determining whether a user is directing an utterance to the system, interpreting a user command, responding to a user command, etc.

The wakeword detection component 1404 of the user device 102 may process the audio data, representing the audio 1402, to determine whether speech is represented therein. The user device 102 may use various techniques to determine whether the audio data includes speech. In some examples, the user device 102 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 102 may implement a classifier configured to distinguish speech from background noise. The classifier may be implemented by techniques such as linear classifiers, support vector machines, and decision trees. In still other examples, the user device 102 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 1402, is analyzed to determine if specific characteristics of the audio data match preconfigured acoustic waveforms, audio signatures, or other data corresponding to a wakeword.

Thus, the wakeword detection component 1404 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 1404 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 1404 and/or an input is detected by an input detector, the user device 102 may "wake" and begin transmitting audio data 1406, representing the audio 1402, to the system component(s) 104. The audio data 1406 may include data corresponding to the wakeword; in other embodiments, the portion of the audio corresponding to the wakeword is removed by the user device 102 prior to sending the audio data 1406 to the system component(s) 104. In the case of touch input detection or gesture-based input detection, the audio data may not include a wakeword.

In some implementations, the system 1100 may include more than one system component(s). The system component(s) 104 may respond to different wakewords and/or perform different categories of tasks. Each system component(s) may be associated with its own wakeword such that speaking a certain wakeword results in audio data be sent to and processed by a particular system. For example, detection of the wakeword "Alexa" by the wakeword detection component 1404 may result in sending audio data to system component(s) for processing while detection of the wakeword "Computer" by the wakeword detector may result in sending audio data to system component(s) b for processing. The system may have a separate wakeword and system for different skills/systems (e.g., "Dungeon Master" for a game play skill/system component(s) c) and/or such skills/systems may be coordinated by one or more skill component(s) 1422 of one or more system component(s) 104.

The user device 102/system component(s) may also include a system directed input detector 1420. The system directed input detector 1420 may be configured to determine whether an input to the system (for example speech, a gesture, etc.) is directed to the system or not directed to the system (for example directed to another user, etc.). The system directed input detector 1420 may work in conjunction with the wakeword detection component 1404. If the system directed input detector 1420 determines an input is directed to the system, the user device 102 may "wake" and begin sending captured data for further processing. If data is being processed the user device 102 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 1420 determines an input is not directed to the system (such as a speech or gesture directed to another user) the user device 102 may discard the data and take no further action for processing purposes. In this way the system 1100 may prevent processing of data not directed to the system, thus protecting user privacy. As an indicator to the user, however, the system may output an audio, visual, or other indicator when the system directed input detector 1420 is determining whether an input is potentially device directed. For example, the system may output an orange indicator while considering an input, and may output a green indicator if a system directed input is detected. Other such configurations are possible.

Upon receipt by the system component(s) 104, the audio data 1406 may be sent to an orchestrator component 1412 and/or the LM orchestrator component 1112. The orchestrator component 1412 may include memory and logic that enables the orchestrator component 1412 to transmit various pieces and forms of data to various components of the system, as well as perform other operations as described herein. In some embodiments, the orchestrator component 1412 may optionally be included in the system component(s) 104. In embodiments where the orchestrator component 1412 is not included in the system component(s) 104, the audio data 1406 may be sent directly to the LM orchestrator component 1112. Further, in such embodiments, each of the components of the system component(s) 104 may be configured to interact with the LM orchestrator component 1112, the action plan execution component 1116, and/or the API provider component.

In some embodiments, the system component(s) 104 may include an arbitrator component 1414, which may be configured to determine whether the orchestrator component 1412 and/or the LM orchestrator component 1112 are to process with respect to the audio data 1406. In some embodiments, the LM orchestrator component 1112 may be selected to process with respect to the audio data 1406 only if the user 1102 associated with the audio data 1406 (or the user device 102 that captured the audio 1402) has previously indicated that the LM orchestrator component 1112 may be selected to process with respect to user inputs received from the user 1102.

In some embodiments, the arbitrator component 1414 may determine the orchestrator component 1412 and/or the LM orchestrator component 1112 are to process with respect to the audio data 1406 based on metadata associated with the audio data 1406. For example, the arbitrator component 1414 may be a classifier configured to process a natural language representation of the audio data 1406 (e.g., output by the ASR component 144) and classify the corresponding user input as to be processed by the orchestrator component 1412 and/or the LM orchestrator component 1112. For further example, the arbitrator component 1414 may determine whether the device from which the audio data 1406 is received is associated with an indicator representing the audio data 1406 is to be processed by the orchestrator component 1412 and/or the LM orchestrator component 1112. As an even further example, the arbitrator component 1414 may determine whether the user (e.g., determined using data output from the user recognition component 1416) from which the audio data 1406 is received is associated with a user profile including an indicator representing the audio data 1406 is to be processed by the orchestrator component 1412 and/or the LM orchestrator component 1112. As another example, the arbitrator component 1414 may determine whether the audio data 1406 (or the output of the ASR component 144) corresponds to a request representing that the audio data 1406 is to be processed by the orchestrator component 1412 and/or the LM orchestrator component 1112 (e.g., a request including "let's chat" may represent that the audio data 1406 is to be processed by the LM orchestrator component 1112).

In some embodiments, if the arbitrator component 1414 is unsure (e.g., a confidence score corresponding to whether the orchestrator component 1412 and/or the LM orchestrator component 1112 is to process is below a threshold), then the arbitrator component 1414 may send the audio data 1406 to both of the orchestrator component 1412 and the LM orchestrator component 1112. In such embodiments, the orchestrator component 1412 and/or the LM orchestrator component 1112 may include further logic for determining further confidence scores during processing representing whether the orchestrator component 1412 and/or the LM orchestrator component 1112 should continue processing, as is discussed further herein below.

The arbitrator component 1414 may send the audio data 1406 to an ASR component 144. In some embodiments, the component selected to process the audio data 1406 (e.g., the orchestrator component 1412 and/or the LM orchestrator component 1112) may send the audio data 1406 to the ASR component 144. The ASR component 144 may transcribe the audio data 1406 into text data. The text data output by the ASR component 144 represents one or more than one (e.g., in the form of an N-best list) ASR hypotheses representing speech represented in the audio data 1406. The ASR component 144 interprets the speech in the audio data 1406 based on a similarity between the audio data 1406 and pre-established language models. For example, the ASR component 144 may compare the audio data 1406 with models for sounds (e.g., acoustic units such as phonemes, senons, phones, etc.) and sequences of sounds to identify words that match the sequence of sounds of the speech represented in the audio data 1406. The ASR component 144 sends the text data generated thereby to the arbitrator component 1414, the orchestrator component 1412, and/or the LM orchestrator component 1112. In instances where the text data is sent to the arbitrator component 1414, the arbitrator component 1414 may send the text data to the component selected to process the audio data 1406 (e.g., the orchestrator component 1412 and/or the LM orchestrator component 1112). The text data sent from the ASR component 144 to the arbitrator component 1414, the orchestrator component 1412, and/or the LM orchestrator component 1112 may include a single top-scoring ASR hypothesis or may include an N-best list including multiple top-scoring ASR hypotheses. An N-best list may additionally include a respective score associated with each ASR hypothesis represented therein.

A skill system component(s) 1450 may communicate with a skill component(s) 1422 within the system component(s) 104 directly with the orchestrator component 1412 and/or the action plan execution component 1116, or with other components. A skill system component(s) 1450 may be configured to perform one or more actions. An ability to perform such action(s) may sometimes be referred to as a "skill." That is, a skill may enable a skill system component(s) 1450 to execute specific functionality in order to provide data or perform some other action requested by a user. For example, a weather service skill may enable a skill system component(s) 1450 to provide weather information to the system component(s) 104, a car service skill may enable a skill system component(s) 1450 to book a trip with respect to a taxi or ride sharing service, an order pizza skill may enable a skill system component(s) 1450 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 104 may be configured with a skill component 1422 dedicated to interacting with the skill system component(s) 1450. Unless expressly stated otherwise, reference to a skill, skill device, or skill component may include a skill component 1422 operated by the system component(s) 104 and/or skill operated by the skill system component(s) 1450. Moreover, the functionality described herein as a skill or skill may be referred to using many different terms, such as an action, bot, app, or the like. The skill component 1422 and or skill system component(s) 1450 may return output data to the orchestrator component 1412.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system component(s) includes a TTS component 1124. The TTS component 1124 may generate audio data (e.g., synthesized speech) from text data using one or more different methods. Text data input to the TTS component 1124 may come from a skill component 1422, the orchestrator component 1412, or another component of the system. In one method of synthesis called unit selection, the TTS component 1124 matches text data against a database of recorded speech. The TTS component 1124 selects matching units of recorded speech and concatenates the units together to form audio data. In another method of synthesis called parametric synthesis, the TTS component 1124 varies parameters such as frequency, volume, and noise to create audio data including an artificial speech waveform. Parametric synthesis uses a computerized voice generator, sometimes called a vocoder.

The user device 102 may include still image and/or video capture components such as a camera or cameras to capture one or more images. The user device 102 may include circuitry for digitizing the images and/or video for transmission to the system component(s) 104 as image data. The user device 102 may further include circuitry for voice command-based control of the camera, allowing a user 1102 to request capture of image or video data. The user device 102 may process the commands locally or send audio data 1406 representing the commands to the system component(s) 104 for processing, after which the system component(s) 104 may return output data that can cause the user device 102 to engage its camera.

The system component(s) 104/the user device 102 may include a user recognition component 1416 that recognizes one or more users using a variety of data. However, the disclosure is not limited thereto, and the user device 102 may include the user recognition component 1416 instead of and/or in addition to the system component(s) 104 without departing from the disclosure.

The user recognition component 1416 may take as input the audio data 1406 and/or text data output by the ASR component 144. The user recognition component 1416 may perform user recognition by comparing audio characteristics in the audio data 1406 to stored audio characteristics of users. The user recognition component 1416 may also perform user recognition by comparing biometric data (e.g., fingerprint data, iris data, etc.), received by the system in correlation with the present user input, to stored biometric data of users assuming user permission and previous authorization. The user recognition component 1416 may further perform user recognition by comparing image data (e.g., including a representation of at least a feature of a user), received by the system in correlation with the present user input, with stored image data including representations of features of different users. The user recognition component 1416 may perform additional user recognition processes, including those known in the art.

The user recognition component 1416 determines scores indicating whether user input originated from a particular user. For example, a first score may indicate a likelihood that the user input originated from a first user, a second score may indicate a likelihood that the user input originated from a second user, etc. The user recognition component 1416 also determines an overall confidence regarding the accuracy of user recognition operations.

Output of the user recognition component 1416 may include a single user identifier corresponding to the most likely user that originated the user input. Alternatively, output of the user recognition component 1416 may include an N-best list of user identifiers with respective scores indicating likelihoods of respective users originating the user input. The output of the user recognition component 1416 may be used to inform processing of the arbitrator component 1414, the orchestrator component 1412, and/or the LM orchestrator component 1112 as well as processing performed by other components of the system.

The system component(s) 104/user device 102 may include a presence detection component that determines the presence and/or location of one or more users using a variety of data.

The system 1100 (either on user device 102, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 1418 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 102, the user profile (associated with the presented login information) may be updated to include information about the user device 102, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 1418 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 1418 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Although the components of FIG. 14 may be illustrated as part of system component(s) 104, user device 102, or otherwise, the components may be arranged in other device(s) (such as in user device 102 if illustrated in system component(s) 104 or vice-versa, or in other device(s) altogether) without departing from the disclosure.

In at least some embodiments, the system component(s) may receive the audio data 1406 from the user device 102, to recognize speech corresponding to a spoken input in the received audio data 1406, and to perform functions in response to the recognized speech. In at least some embodiments, these functions involve sending directives (e.g., commands), from the system component(s) to the user device 102 (and/or other devices) to cause the user device 102 to perform an action, such as output an audible response to the spoken input via a loudspeaker(s), and/or control secondary devices in the environment by sending a control command to the secondary devices.

Thus, when the user device 102 is able to communicate with the system component(s) over the networks(s) 106, some or all of the functions capable of being performed by the system component(s) may be performed by sending one or more directives over the networks(s) 106 to the user device 102, which, in turn, may process the directive(s) and perform one or more corresponding actions. For example, the system component(s), using a remote directive that is included in response data (e.g., a remote response), may instruct the user device 102 to output an audible response (e.g., using TTS processing performed by an on-device TTS component) to a user's question via a loudspeaker(s) of (or otherwise associated with) the user device 102, to output content (e.g., music) via the loudspeaker(s) of (or otherwise associated with) the user device 102, to display content on a display of (or otherwise associated with) the user device 102, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 1102 as part of a shopping function, establishing a communication session (e.g., a video call) between the user 1102 and another user, and so on.

In at least some embodiments, a hybrid selector, of the user device 102, may send the audio data 1406 to the wakeword detection component 1404. If the wakeword detection component 1404 detects a wakeword in the audio data 1406, the wakeword detection component 1404 may send an indication of such detection to the hybrid selector. In response to receiving the indication, the hybrid selector may send the audio data 1406 to the system component(s) and/or the ASR component of the user device 102. The wakeword detection component 1404 may also send an indication, to the hybrid selector, representing a wakeword was not detected. In response to receiving such an indication, the hybrid selector may refrain from sending the audio data 1406 to the system component(s), and may prevent the ASR component of the user device 102 from further processing the audio data 1406. In this situation, the audio data 1406 can be discarded.

The user device 102 may conduct its own speech processing using on-device language processing components, such as an ASR component, similar to the manner discussed herein with respect to the ASR component 144 of the system component(s). The user device 102 may also internally include, or otherwise have access to, other components such as one or more skill components capable of executing commands based on the output of an orchestrator component, an LM orchestrator, or other results determined by the user device 102/system component(s) (which may operate similarly to skill components 1422), an arbitrator component (configured to process in a similar manner to that discussed herein above with respect to the arbitrator component 1414), an action plan execution component (configured to process in a similar manner to that discussed herein with respect to the action plan execution component 1116), a context handler component (configured to process in a similar manner to that discussed herein with respect to the context handler component 1126), a user recognition component (configured to process in a similar manner to that discussed herein with respect to the user recognition component 1416 of the system component(s)), profile storage (configured to store similar profile data to that discussed herein with respect to the profile storage 1418 of the system component(s)), or other components. In at least some embodiments, the profile storage may only store profile data for a user or group of users specifically associated with the user device 102. Similar to as described above with respect to skill component 1422, a skill component of the user device 102 may communicate with a skill system component(s) 1450. The user device 102 may also have its own TTS component, which may operate similarly to TTS component 1124.

In at least some embodiments, the on-device language processing components may not have the same capabilities as the language processing components of the system component(s). For example, the on-device language processing components may be configured to handle only a subset of the natural language user inputs that may be handled by the system component(s). For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s). If the user device 102 attempts to process a natural language user input for which the on-device language processing components are not necessarily best suited, the language processing results determined by the user device 102 may indicate a low confidence or other metric indicating that the processing by the user device 102 may not be as accurate as the processing done by the system component(s).

The hybrid selector, of the user device 102, may include a hybrid proxy (HP) configured to proxy traffic to/from the system component(s). For example, the HP may be configured to send messages to/from a hybrid execution controller (HEC) of the hybrid selector. For example, command/directive data received from the system component(s) can be sent to the HEC using the HP. The HP may also be configured to allow the audio data 1406 to pass to the system component(s) while also receiving (e.g., intercepting) this audio data 1406 and sending the audio data 1406 to the HEC.

In at least some embodiments, the hybrid selector may further include a local request orchestrator (LRO) configured to notify the ASR component of the user device 102 about the availability of new audio data 1406 that represents user speech, and to otherwise initiate the operations of local language processing when new audio data 1406 becomes available. In general, the hybrid selector may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the user device 102 receives directive data from the system component(s) and chooses to use that remotely-determined directive data.

Thus, when the audio data 1406 is received, the HP may allow the audio data 1406 to pass through to the system component(s) and the HP may also input the audio data 1406 to the on-device ASR component by routing the audio data 1406 through the HEC of the hybrid selector, whereby the LRO notifies the on-device ASR component of the audio data 1406. At this point, the hybrid selector may wait for response data from either or both of the system component(s) or the local language processing components. However, the disclosure is not limited thereto, and in some examples the hybrid selector may send the audio data 1406 only to the local ASR component without departing from the disclosure. For example, the user device 102 may process the audio data 1406 locally without sending the audio data 1406 to the system component(s).

The local ASR component is configured to receive the audio data 1406 from the hybrid selector, and to recognize speech in the audio data 1406. The user device 102 and/or the system component(s) may associate a unique identifier with each natural language user input. The user device 102 may include the unique identifier when sending the audio data 1406 to the system component(s), and the response data from the system component(s) may include the unique identifier to identify which natural language user input the response data corresponds.

In at least some embodiments, the user device 102 may include, or be configured to use, one or more skill components that may work similarly to the skill component(s) 1422 implemented by the system component(s). The skill component(s) may correspond to one or more domains that are used in order to determine how to act on a spoken input in a particular way, such as by outputting a directive that corresponds to the determined intent, and which can be processed to implement the desired operation. The skill component(s) installed on the user device 102 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the user device 102 may be in communication with one or more skill system component(s) 1450. For example, a skill system component(s) 1450 may be located in a remote environment (e.g., separate location) such that the user device 102 may only communicate with the skill system component(s) 1450 via the networks(s) 106. However, the disclosure is not limited thereto. For example, in at least some embodiments, a skill system component(s) 1450 may be configured in a local environment (e.g., home server and/or the like) such that the user device 102 may communicate with the skill system component(s) 1450 via a private network, such as a local area network (LAN).

A skill system component(s) 1450 may communicate with a skill component(s) 1122 within the system component(s) 104 directly with the orchestrator component 1412 and/or the action plan execution component 1116, or with other components. A skill system component(s) 1450 may be configured to perform one or more actions. An ability to perform such action(s) may sometimes be referred to as a "skill." That is, a skill may enable a skill system component(s) 1450 to execute specific functionality in order to provide data or perform some other action requested by a user. For example, a weather service skill may enable a skill system component(s) 1450 to provide weather information to the system component(s) 104, a car service skill may enable a skill system component(s) 1450 to book a trip with respect to a taxi or ride sharing service, an order pizza skill may enable a skill system component(s) 1450 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 104 may be configured with a skill component 1122 dedicated to interacting with the skill system component(s) 1450. Unless expressly stated otherwise, reference to a skill, skill device, or skill component may include a skill component 1122 operated by the system component(s) 104 and/or skill operated by the skill system component(s) 1450. Moreover, the functionality described herein as a skill or skill may be referred to using many different terms, such as an action, bot, app, or the like. The skill component 1122 and or skill system component(s) 1450 may return output data to the orchestrator component 1412.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system component(s) includes a TTS component 1124. The TTS component 1124 may generate audio data (e.g., synthesized speech) from text data using one or more different methods. Text data input to the TTS component 1124 may come from a skill component 1122, the orchestrator component 1412, or another component of the system. In one method of synthesis called unit selection, the TTS component 1124 matches text data against a database of recorded speech. The TTS component 1124 selects matching units of recorded speech and concatenates the units together to form audio data. In another method of synthesis called parametric synthesis, the TTS component 1124 varies parameters such as frequency, volume, and noise to create audio data including an artificial speech waveform. Parametric synthesis uses a computerized voice generator, sometimes called a vocoder.

The user device 102 may include still image and/or video capture components such as a camera or cameras to capture one or more images. The user device 102 may include circuitry for digitizing the images and/or video for transmission to the system component(s) 104 as image data. The user device 102 may further include circuitry for voice command-based control of the camera, allowing a user 1102 to request capture of image or video data. The user device 102 may process the commands locally or send audio data 1406 representing the commands to the system component(s) 104 for processing, after which the system component(s) 104 may return output data that can cause the user device 102 to engage its camera.

The system component(s) 104 may include a user recognition component 1416 that recognizes one or more users using a variety of data. The user recognition component 1416 may take as input the audio data 1406 and/or text data output by the ASR component 144. The user recognition component 1416 may perform user recognition by comparing audio characteristics in the audio data 1406 to stored audio characteristics of users. The user recognition component 1416 may also perform user recognition by comparing biometric data (e.g., fingerprint data, iris data, etc.), received by the system in correlation with the present user input, to stored biometric data of users assuming user permission and previous authorization. The user recognition component 1416 may further perform user recognition by comparing image data (e.g., including a representation of at least a feature of a user), received by the system in correlation with the present user input, with stored image data including representations of features of different users. The user recognition component 1416 may perform additional user recognition processes, including those known in the art.

The user recognition component 1416 determines scores indicating whether user input originated from a particular user. For example, a first score may indicate a likelihood that the user input originated from a first user, a second score may indicate a likelihood that the user input originated from a second user, etc. The user recognition component 1416 also determines an overall confidence regarding the accuracy of user recognition operations.

Output of the user recognition component 1416 may include a single user identifier corresponding to the most likely user that originated the user input. Alternatively, output of the user recognition component 1416 may include an N-best list of user identifiers with respective scores indicating likelihoods of respective users originating the user input. The output of the user recognition component 1416 may be used to inform processing of the arbitrator component 1414, the orchestrator component 1412, and/or the LM orchestrator component 1112 as well as processing performed by other components of the system.

The system component(s) 104/user device 102 may include a presence detection component that determines the presence and/or location of one or more users using a variety of data.

The system 1100 (either on user device 102, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 1418 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 102, the user profile (associated with the presented login information) may be updated to include information about the user device 102, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 1418 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 1418 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Although the components of FIG. 14 may be illustrated as part of system component(s) 104, user device 102, or otherwise, the components may be arranged in other device(s) (such as in user device 102 if illustrated in system component(s) 104 or vice-versa, or in other device(s) altogether) without departing from the disclosure.

In at least some embodiments, the system component(s) may receive the audio data 1406 from the user device 102, to recognize speech corresponding to a spoken input in the received audio data 1406, and to perform functions in response to the recognized speech. In at least some embodiments, these functions involve sending directives (e.g., commands), from the system component(s) to the user device 102 (and/or other user devices) to cause the user device 102 to perform an action, such as output an audible response to the spoken input via a loudspeaker(s), and/or control secondary devices in the environment by sending a control command to the secondary devices.

Thus, when the user device 102 is able to communicate with the system component(s) over the networks(s) 106, some or all of the functions capable of being performed by the system component(s) may be performed by sending one or more directives over the networks(s) 106 to the user device 102, which, in turn, may process the directive(s) and perform one or more corresponding actions. For example, the system component(s), using a remote directive that is included in response data (e.g., a remote response), may instruct the user device 102 to output an audible response (e.g., using TTS processing performed by an on-device TTS component) to a user's question via a loudspeaker(s) of (or otherwise associated with) the user device 102, to output content (e.g., music) via the loudspeaker(s) of (or otherwise associated with) the user device 102, to display content on a display of (or otherwise associated with) the user device 102, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 1102 as part of a shopping function, establishing a communication session (e.g., a video call) between the user 1102 and another user, and so on.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system, comprising:
one or more processors; and
non-transitory computer-readable media storing computer-executable instructions that, when executed by the one or more processors, cause the one or more processors to perform operations comprising:
receiving a first user input within a first input processing architecture, the first input processing architecture including a language model (LM) configured for determining responses to user inputs;
determining, by the LM of the first input processing architecture, a first action plan associated with a first action domain, the first action domain being one of multiple action domains utilized by the first input processing architecture to respond to the user inputs;
determining a first domain application programming interface (API) associated with the first action domain;
determining, after the first action plan is determined by the LM, that the first domain API is predefined for interfacing with a second input processing architecture that differs at least in part from the first input processing architecture, the second input processing architecture being associated with multiple applications configured to determine actions to be performed responsive to the first user input, an application of the multiple applications being associated with the first domain API;
determining, utilizing the application associated with the second input processing architecture, a first input processing result associated with the first user input, the first input processing result differing at least partially from the first action plan determined by the LM;
providing the first input processing result to the first domain API; and
causing, utilizing the LM, the first input processing architecture to utilize the first domain API and the first input processing result to determine a first action to be performed responsive to the first user input.

2. The system of claim 1, the operations further comprising:
receiving a second user input within the first input processing architecture;
determining, by the LM, a second action plan associated with a second action domain, the second action domain differing from the first action domain;
determining a second domain API associated with the second action domain;
determining, after determining the second action plan, that the second domain API is predefined for interfacing with the second input processing architecture and differs from the first domain API;
determining, using a second application associated with the second domain API, a second input processing result associated with the second user input; and
providing the second input processing result to the second input processing architecture via the second domain API.

3. The system of claim 1, the operations further comprising:
receiving, at a response sink, data representing a response associated with the first input processing result, the data representing the response configured to be utilized by one or more devices for performing an action associated with the first input processing result;
causing the data representing the response to be maintained at the response sink instead of being sent to the one or more devices based at least in part on the application being associated with the first domain API; and sending, utilizing the response sink, the data representing the response to the first domain API.

4. The system of claim 1, the operations further comprising:
receiving a second user input within the first input processing architecture;
determining a second action domain associated with the second user input;
determining a second domain API associated with the second action domain, wherein the second domain API is configured for use within the first input processing architecture instead of the second input processing architecture; and
determining, using the second domain API and within the first input processing architecture, a second input processing result associated with the second user input, wherein the second domain API is utilized to determine the second input processing result instead of the second input processing architecture based at least in part on the second domain API being configured for use within the first input processing architecture instead of the second input processing architecture.

5. A method, comprising:
receiving first data representing a first user input within a first input processing architecture;
determining, utilizing a language model (LM) of the first input processing architecture, a first action plan associated with the first user input;
determining, by the first input processing architecture, a first action domain associated with the first action plan;
determining a first domain application programming interface (API) associated with the first action domain;
determining, after determining the first action plan by the LM, that the first domain API is predefined for interfacing with a second input processing architecture that differs at least in part from the first input processing architecture;
determining, utilizing an application of multiple applications associated with the second input processing architecture, a first input processing result associated with the first user input; and
causing, utilizing the LM, the first input processing architecture to utilize the first input processing result from the first domain API to determine a first action to be performed responsive to the first user input.

6. The method of claim 5, further comprising:
receiving a second user input within the first input processing architecture;
determining a second action domain associated with the second user input;
determining a second domain API associated with the second action domain;
determining, using a second application associated with the second domain API, a second input processing result associated with the second user input; and
providing the second input processing result to the first input processing architecture.

7. The method of claim 5, further comprising:
receiving, at a response sink, data representing a response associated with the first input processing result, the data representing the response configured to be utilized for performing an action associated with the first input processing result, wherein the response sink is configured to maintain the response such that the second input processing architecture is prevented from sending the response to one or more devices to perform the action;
causing the data representing the response to be maintained at the response sink; and
sending, utilizing the response sink, the data representing the response to the first domain API.

8. The method of claim 5, further comprising:
receiving a second user input within the first input processing architecture;
determining a second action domain associated with the second user input;
determining a second domain API associated with the second action domain, wherein the second domain API is configured for use within the first input processing architecture instead of the second input processing architecture; and
determining, within the first input processing architecture, a second input processing result associated with the second user input, wherein the second domain API is utilized to determine the second input processing result.

9. The method of claim 5, further comprising:
identifying a trained model configured to utilize historical data to generate input processing results, wherein the trained model is at least partially not available to the first input processing architecture, wherein determining the first input processing result comprises determining the first input processing result utilizing the trained model; and
formatting the first input processing result to be utilized by the first input processing architecture.

10. The method of claim 5, wherein the first input processing architecture includes a language model (LM) configured to determine responses to user inputs, and the method further comprising:
determining, utilizing the LM, a second input processing result associated with the first user input;
determining that the first input processing result from the second input processing architecture conflicts with the second input processing result determined utilizing the LM; and
causing, based at least in part on the first input processing result conflicting with the second input processing result, the first input processing architecture to utilize the second input processing result instead of the first input processing result.

11. The method of claim 5, wherein the first input processing architecture includes a LM configured to determine responses to user inputs, and the method further comprising:
determining, utilizing the LM, a second input processing result associated with the first user input;
determining a similarity value between the first input processing result and the second input processing result;
determining that the similarity value satisfies a similarity threshold; and
disabling, based at least in part on the similarity value satisfying the similarity threshold, an interface between the first domain API and the second input processing architecture.

12. The method of claim 5, wherein the first input processing architecture includes a LM configured to determine responses to user inputs, and the method further comprising:
determining, utilizing the LM, a second input processing result associated with the user inputs;
determining that the second input processing result is associated with a confidence value indicating insufficient confidence that the second input processing result is accurately associated with the user inputs; and generating, based at least in part on the confidence value, the first domain API associated with the first action domain.

13. A system, comprising:

one or more processors; and non-transitory computer-readable media storing computer-executable instructions that, when executed by the one or more processors, cause the one or more processors to perform operations comprising:

receiving first audio data representing a first user input within a first input processing architecture comprising a language model (LM);

determining, by the first input processing architecture, a first action domain associated with the first user input;

determining a first domain application programming interface (API) associated with the first action domain, wherein the first domain API is predefined for interfacing with a second input processing architecture that differs at least in part from the first input processing architecture;

determining, utilizing an application of multiple applications associated with the second input processing architecture, a first input processing result associated with the first user input;

providing the first input processing result to the first domain API; and causing, utilizing the LM, the first input processing architecture to utilize the first input processing result from the first domain API to determine a first action to be performed responsive to the first user input.

14. The The system of claim 13, the operations further comprising:

determining, utilizing the LM, a second input processing result associated with the first user input;

determining that the second input processing result is associated with a confidence value indicating insufficient confidence that the input processing result is accurately associated with the first user input; and generating, based at least in part on the confidence value, the first domain API associated with the first action domain.

15. The system of claim 13, the operations further comprising:

determining, utilizing the LM, a second input processing result associated with the first user input;

determining a similarity value between the first input processing result and the second input processing result;

determining that the similarity value satisfies a similarity threshold; and disabling, based at least in part on the similarity value satisfying the similarity threshold, an interface between the first domain API and the second input processing architecture.

16. The system of claim 13, the operations further comprising:

receiving a second user input within the first input processing architecture;

determining a second action domain associated with the second user input;

determining a second domain API associated with the second action domain;

determining, using a second application associated with the second domain API, a second input processing result associated with the second user input; and providing the second input processing result to the second input processing architecture.

17. The system of claim 13, the operations further comprising:

receiving, at a directive sink, data representing a directive associated with the first input processing result, the data representing the directive configured to be utilized for performing an action associated with the first input processing result;

causing the data representing the directive to be maintained at the directive sink; and sending, utilizing the directive sink, the data representing the directive to the first domain API.

18. The system of claim 13, the operations further comprising:

receiving a second user input within the first input processing architecture;

determining a second action domain associated with the second user input;

determining a second domain API associated with the second action domain, wherein the second domain API is unassociated with the second input processing architecture; and determining, within the first input processing architecture, a second input processing result associated with the second user input, wherein the second domain API is utilized to determine the second input processing result.

19. The system of claim 13, the operations further comprising:

identifying a trained model configured to utilize historical data to generate input processing results, wherein the trained model is at least partially not available to the first input processing architecture, wherein determining the first input processing result comprises determining the first input processing result utilizing the historical data and the trained model; and formatting the first input processing result to be utilized by the first input processing architecture.

20. The system of claim 13, the operations further comprising:

determining, utilizing the LM, a second input processing result associated with the first user input;

determining that the first input processing result from the second input processing architecture conflicts with the second input processing result determined utilizing the LM; and causing, based at least in part on the first input processing result conflicting with the second input processing result, the first input processing architecture to utilize the second input processing result instead of the first input processing result.

* * * * *